United States Patent [19]
Shoji et al.

[11] Patent Number: 6,031,527
[45] Date of Patent: Feb. 29, 2000

[54] METHODS AND SYSTEMS FOR DEVELOPING COMPUTER APPLICATIONS

[75] Inventors: Wataru Shoji; Daisuke Tabuchi; Ichiro Nakajima, all of Tokyo, Japan

[73] Assignee: Sofmap Future Design, Inc., Tokyo, Japan

[21] Appl. No.: 08/679,055

[22] Filed: Jul. 12, 1996

[51] Int. Cl.[7] .................................................. G06F 15/00
[52] U.S. Cl. .......................... 345/333; 345/335; 345/346; 345/967
[58] Field of Search .................................. 345/333, 334, 345/335, 339, 340, 342, 346, 347, 326, 348, 349, 357, 967; 395/777, 682, 683, 684, 685, 701, 702, 703, 704, 705; 707/501, 514, 515, 102, 103

[56] References Cited

U.S. PATENT DOCUMENTS

| | | | |
|---|---|---|---|
| 4,982,344 | 1/1991 | Jordan | 345/346 |
| 5,519,875 | 5/1996 | Yokoyama et al. | 395/800 |
| 5,555,370 | 9/1996 | Li et al. | 345/335 |
| 5,619,636 | 4/1997 | Sweat et al. | 345/348 |
| 5,675,752 | 10/1997 | Scott et al. | 345/333 |
| 5,694,594 | 12/1997 | Chang | 707/501 |

FOREIGN PATENT DOCUMENTS

| | | |
|---|---|---|
| 0 121 015 A1 | 10/1984 | European Pat. Off. . |
| 0 513 553 A2 | 11/1992 | European Pat. Off. . |
| 0 592 091 A2 | 4/1994 | European Pat. Off. . |
| 0 592 091 A3 | 4/1994 | European Pat. Off. . |
| WO 94/28480 | 12/1994 | WIPO . |

OTHER PUBLICATIONS

"The Touring Machine System"; Communication of the ACM; vol. 36, No. 1, Jan. 1993, pp. 68–77.

Schilit, B. N., et al.; "TeleWeb: Loosely Connected Access to the World Wide Web"; Computer Networks and ISDN Systems; vol. 28, No. 11, May 1996; pp. 1431–1444.

Nachbar, D.; "When Network File Systems Aren't Enough: Automatic Software Distribution Revisited"; Usenix Summer conference Proceedings, Jun. 9, 1986; pp. 159–171.

Hiroyuki Tarumi, et al.: "Canae—A User Interface Construction Environment With Editors as Software Parts"; NEC Research and Development; No. 98, Jul. 1990; pp. 89–97.

Dingle A. et al.; "Web Cache Coherence"; Computer Networks and ISDN Systems; vol. 28 No. 11, May 1996; p. 907–920.

*Primary Examiner*—Ba Huynh
*Attorney, Agent, or Firm*—H. C. Chan

[57] ABSTRACT

An application can be formed by using a plurality of program modules each having an associated display window. These modules could communicate with each other to perform desired activities. A user organizes the windows associated with these modules in a desired spatial arrangement. Various parent-child relationships among the display windows are used to place constraints on the appearance of the windows. When the program modules are executed, they communicate with each other to perform desired activities while the associated windows maintain a predetermined graphic relationship. Consequently, the application gives the appearance that it contains tightly coupled program modules instead of modules that can be selected and arranged easily by a user with little programming experience.

12 Claims, 19 Drawing Sheets

METHODS AND SYSTEMS FOR DEVELOPING COMPUTER APPLICATIONS

BACKGROUND OF THE INVENTION

When computers were first developed, they were very expensive. As a result, only large research institutions and corporations could afford them. Consequently, computers were primarily being used to solve scientific problems (e.g., simulating the behavior of fluid) and support business operations of large corporations (e.g., processing accounting and customer records of insurance companies). The software programs designed for these purposes communicate with users using numbers and text. The users of these software programs were technically trained, and were comfortable in such environment. Thus, there were little needs for these programs to present information in graphic or image forms.

During the past few years, the price of computers decreased drastically. Computers are now purchased by many homes and small businesses. The users of these computers are more comfortable in dealing with multimedia environments involving a combination of graphics, text, image, animation, sound, etc. As a result, various multimedia hardware and software components (such as sound cards, video cards, CDROM readers, game software, educational software, etc.) were rapidly developed. Currently, many computers on the market are sold with a sound card, high resolution video card and color monitor. These computers are sometimes called "multimedia computers." Computer applications that make use of some or all of these components are called multimedia applications.

Multimedia applications are based on graphic images and icons. The interface with users is commonly called a graphic user interface (GUI). In contrast, old style interface is based on single line commands. Multimedia applications are more difficult to write. One of the reasons is that GUI needs to coordinate a large number of computer resources. For example, it typically needs to monitor both a keyboard and a mouse (while command line based interface only needs to monitor a keyboard). Users can click on an icon located anywhere on a computer screen (while command line based interface allows users to enter commands line by line only). The output of GUI could be graphic images, movie and/or audio sound (while command line based interface generates text only). It can be seen from the above that it is not easy to write multimedia applications.

While it is difficult to write multimedia applications, the graphic environment encourages people who had little or no prior programming experience to develop applications. For example, people who have experiences in graphic design, movie making, song writing, etc. could be interested in using their skills and training in a multimedia computer environment. Currently, there is a small number of authoring software that allow users to develop multimedia presentations. An example is Director 5.0 marketed by Macromedia Inc. However, they are difficult to use and the variety of presentations are limited. Consequently, there is a need to develop an easy-to-use and flexible multimedia authoring software.

SUMMARY OF THE INVENTION

The present invention involves a novel way for a user with little programming experience to develop complicated applications using pre-existing program modules. These program modules could be written by the user or one or more software developers. Each module has an associated display window. Some of these program modules could communicate with each other so as to perform, in combination, desired activities. The user can select appropriate program modules to form an application. The user organizes the windows associated with these program modules in a desired arrangement. Graphic relationships of these windows are formed by defining various parent-child relationships among the display windows. These relationships place predetermined constraints on the appearance of the windows. When the program modules are executed, they communicate with each other to perform desired activities while the associated windows maintain the predetermined graphic relationships. Consequently, the application gives a viewer the appearance that it contains tightly coupled program modules instead of modules that can be selected and arranged easily by a user with little programming experience.

These and other features and advantages can be understood from the following detailed description of the invention together with the accompanying drawings.

DETAILED DESCRIPTION OF THE INVENTION

It is desirable to empower computer users to easily design their own applications. An innovative technology, called the "digital cell technology" (DCT), allows users to design applications using program modules (called "cells") having a special structure. This technology is described in a section entitled "Detailed Description of the DCT" attached to the present application. A different embodiment of some aspects of DCT is disclosed in another copending patent application entitled "System for Managing Communication Between Program Modules", attorney docket no. 16276.708, and filed on the same date as the present application. This copending patent application is incorporated herein by reference. The present invention provides additional tools for users to develop more powerful applications.

Figure 1A:
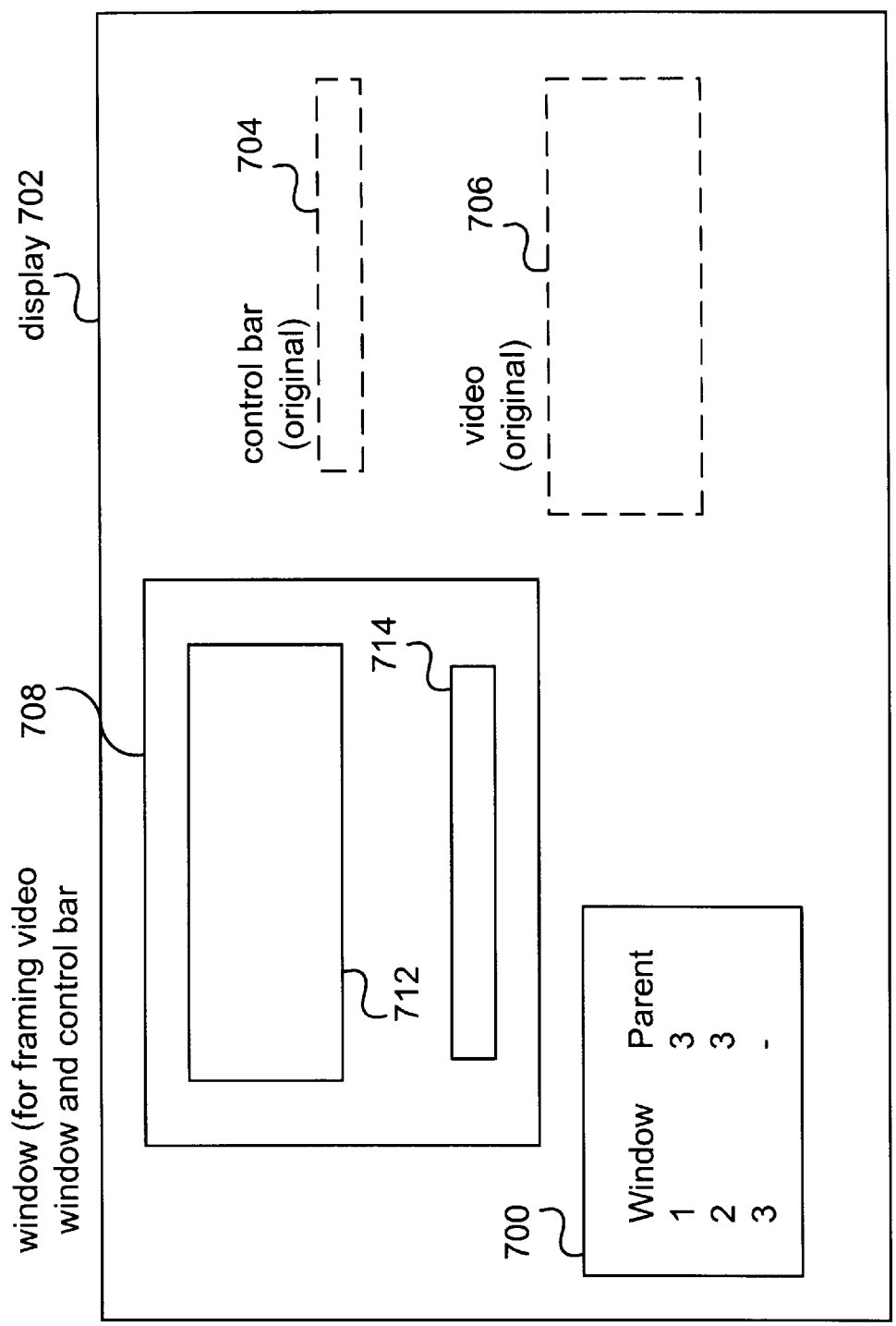
FIG. 1A is a diagram illustrating the actions involved in designing an application using a method of the present invention.
Figure 1B:
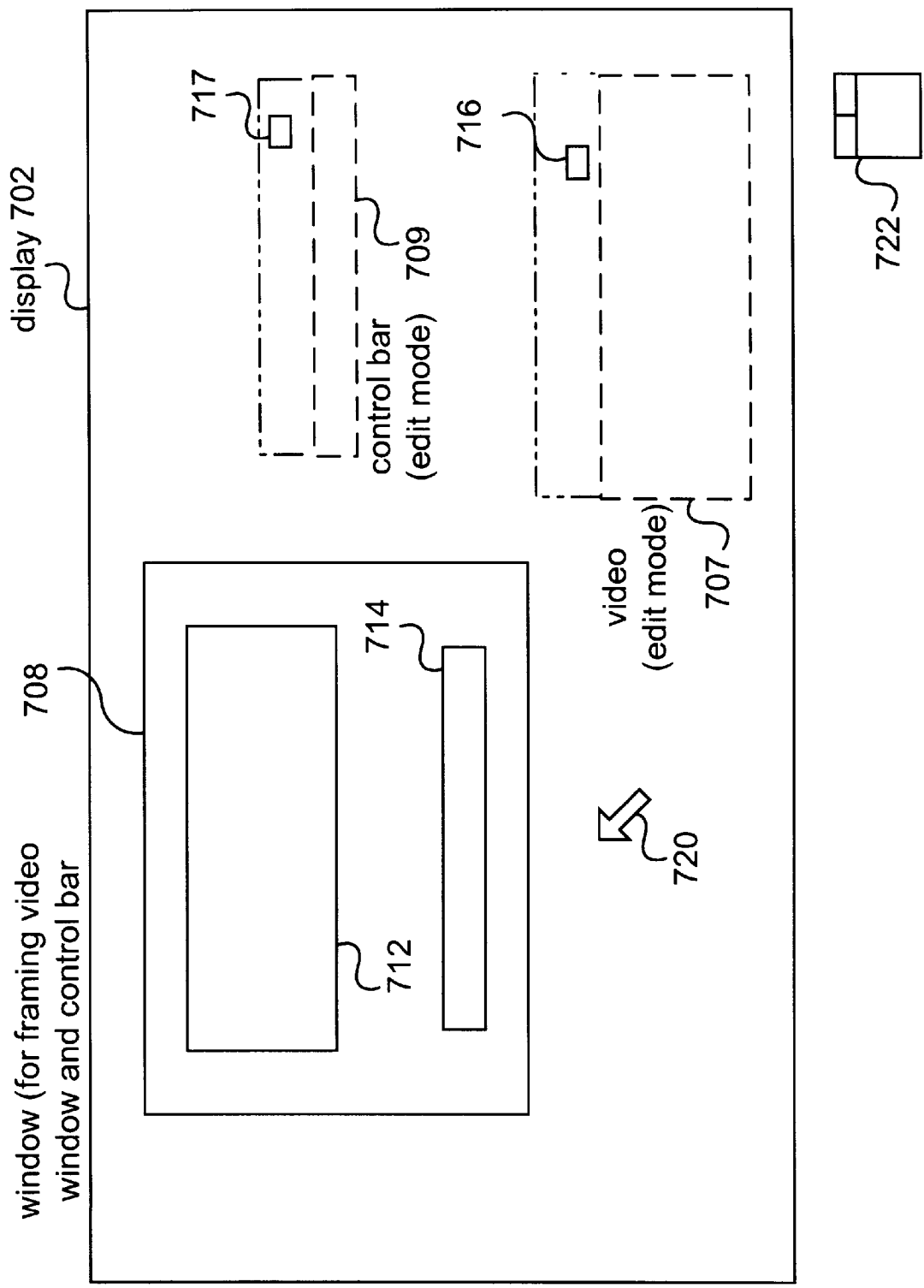
FIG. 1B is a diagram illustrating the actions involved in designing an application using another method of the present invention.

FIGS. 1A and 1B show two embodiments of the present invention. FIG. 1A is used to illustrate the actions of a user in designing a video application under Microsoft's MS Windows operating system. It should be noted that other applications could be designed in MS Windows (or other graphic operating environments) using the same procedure. The user activates a cell (i.e., program module) which generates a window 700 on a computer display 702 for allowing the user to define relationship between other windows. For convenience, this cell is called the "relationship" cell and the associated window is called the "relationship" window. In this example, window 700 contains a table for allowing the user to define relationships. Other means for defining relationships can also be used (e.g., see the method indicated in FIG. 1B). Details of the relationship cell will be described below.

The user then activates a video cell which generates a video window 706 (shown as a dashed block) on display 702. This window allows movies and animations to be shown therein. The name of a video file using this window is defined during activation (a method for defining files associated with cell under DCT is disclosed in the section entitled "Detailed Description of the DCT"). The name can be easily changed so that the same window can be used to display different movies (or animations). This window is registered in relationship window 700 and assigned an identification (e.g., the number 1) under the "window" column of the table. In one embodiment of the present invention, registration can be performed by the following steps: (i) the video cell sends a message to the relationship cell indicating that it is active and (ii) the relationship cell stores this information in its memory space. Messages between the video and relationship cells can be sent using, for example, the communication protocol disclosed in the section entitled "Detailed Description of the DCT" or the incorporated patent application.

The user then activates another cell (called control cell in this application) which generates a control bar window 704 (shown as a dashed block). During activation, the user enters the name of the above described video cell which generates video window 706. The control cell can send messages to the video cell using, for example, the communication protocol disclosed in the section entitled "Detailed Description of the DCT" or the incorporated patent application. As a result, control bar 704 can be used to control the operation of video window 706 (e.g., start, rewind, stop, etc.). Control bar 704 is also registered with relationship window 700 and assigned an identification (e.g., the number 2) under the "window" column of the table.

Finally, the user activates a visual cell which generates a window 708. This window is registered with relationship window 700 and assigned an identification (e.g., the number 3) under the "window" column of the table. As explained below, this window will be used to frame video window 706 and control bar 704. For convenience, this window is called the "framing window." In this example, there is no need for this window to communicate with windows 704 and 706.

The user can drag video window 706 and control bar 704 to separate locations inside framing window 708, e.g., by dragging their title bars (not shown) using a mouse (not shown). These new locations are shown as solid blocks 712 and 714, respectively. At this point in time, window 708 is independent of windows 704 and 706. The user then enters numbers under the "parent" column of relationship window 700 to define a parent-child relationship between windows 708, 712 and 714. In this example, framing window 708 (represented by a numeral 3) is defined to be the parent of windows 712 and 714 (represented by numerals 1 and 2, respectively). This step establishes a specific relationship between windows 712 and 714 on one hand and framing window 708 on another hand. The underlying mechanism for establishing such relationship will be described below.

Once the parent-child relationship has been established, windows 712 and 714 behave as if they are parts of window 708. For example, the user can move framing window 708 to a different location on display 702, and both windows 712 and 714 would also move with framing window 708. This is because one of the characteristics of the parent-child relationship is to fix the position of the child windows (i.e., windows 712 and 714 in this example) relative to the parent window (e.g., framing window 708 in this example).

In one embodiment of the present invention, video window 712 is used to show movies and animations. Control bar contains buttons for controlling the operation of video window 712. For example, when a user clicks on a start button (not shown) on control bar 714, a movie (from the predefined video file) starts to show in video window 712; when the user clicks on a stop button (not shown) on control bar 714, the movie stops; and when the user clicks on a rewind button (not shown) on control bar 714, the movie rewinds from the current time to the beginning. When the user uses a mouse to drag and move framing window 708, the entire content of the window (including video window 712 and control bar 714) moves together. Thus, from the perspective of the user, framing window 708, video window 712 and control bar 714 form parts of a complex application.

In the above example, the control cell controls the video cell by sending commands to the video cell. For example, when the user clicks on a start button, the control cell sends a command to the video cell to start playing of the video. The communication between the control cell and video cell may be carried out using the protocol disclosed in the section entitled "Detailed Description of the DCT" or the incorporated application.

One advantage of the present invention is that a software designer has almost complete control over the design of the application. For example, the designer can select one of several pre-designed control bars to use in the application. Other types of display windows (instead of a video window) could be selected. For example, the designer could select a scroll bar (which is one example of a control bar) to work with a graphic or text window. Thus, the system of the present invention is very robust and flexible.

Another advantage of the present invention is that the system can be easily maintained and upgraded. For example, a software developer can initially ship an authoring software with a small number of control bars and display windows. The developer can add different types of control bars and display windows to the authoring software at convenient times. Further, each component of an application can be upgraded without changing the applications (as long as the interfaces between components are kept the same).

In the prior art method of programming, the above collection of windows (708, 712 and 714) is typically generated by a complex application incorporating movie playing and control routines. Typically, these routines are tightly coupled. A user has to accept the features of the application, and can only change some minor preferences allowed by the application. Upgrades to the application involve delivering another complete application software to users; and the users have to re-instal the whole application. Thus, prior art applications are inflexible, difficult to maintain, and time consuming to upgrade.

It should be pointed out that the parent-child relationship is determined entirely by a user. For example, in the process of designing another application, the user could assign video window 706 as a parent and window 708 as a child. As a result, the present invention allows user a great deal of flexibility in application development.

Figure 2:
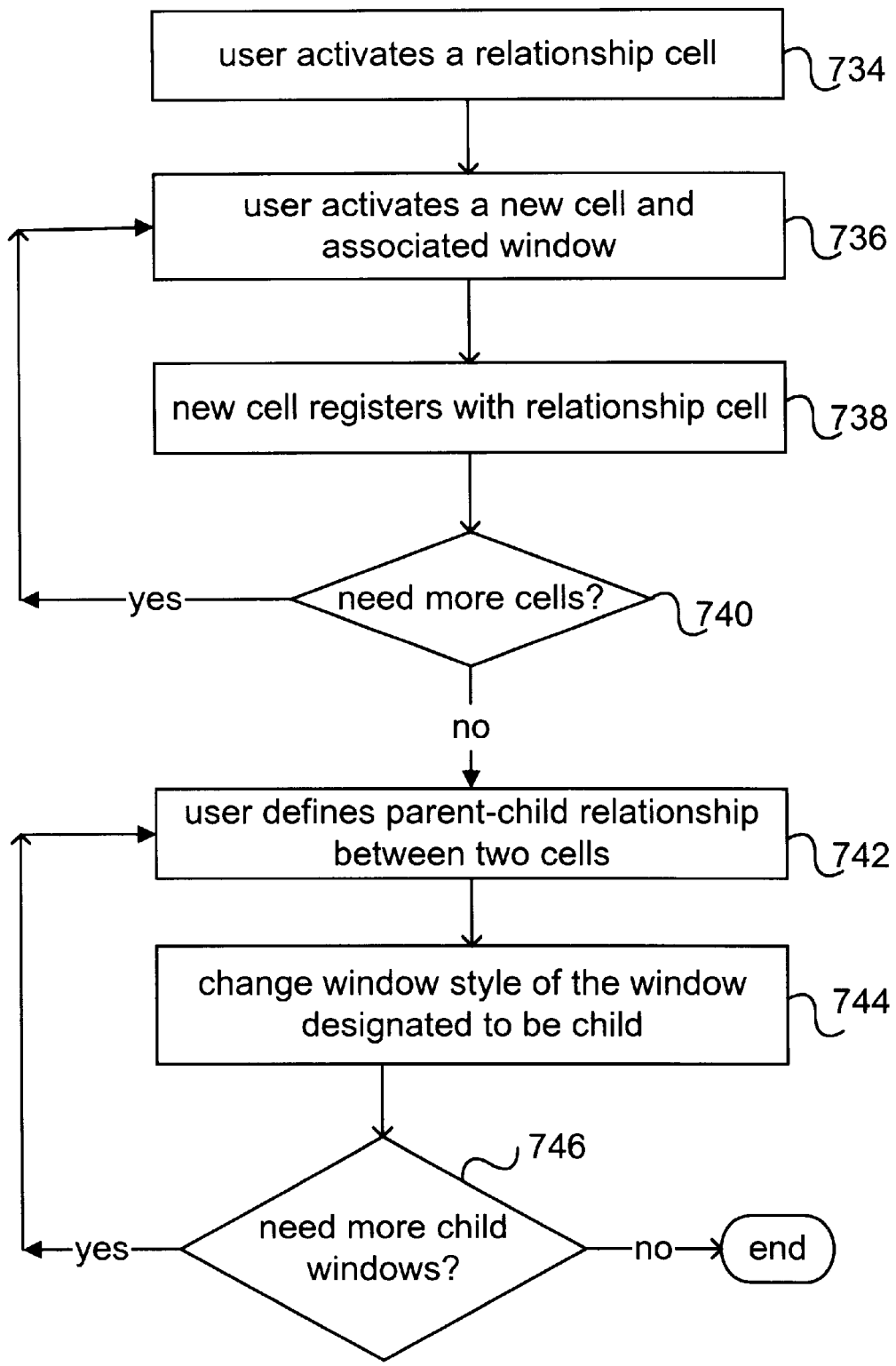
FIG. 2 is a flow chart of the steps that can be used in implementing the application illustrated in FIG. 1A.

FIG. 2 is a flow chart 730 summarizing the above described operation. In step 734, a user activates a relationship cell. This cell displays a relationship window. In step 736, the user activates a program cell (which could be a visual or other cells) which displays a display window. This cell contains program code which communicates with the relationship cell. Examples of communication protocols are the DSF protocol (as explained in detailed in the section entitled "Detailed Description of the DCT") or the protocol explained in detailed in the incorporated application. In step 738, the newly activated cell registers with the relationship cell. This can be performed by sending a message (using the above described communication protocols) to the relationship cell. In step 740, the user determines whether other cells (and windows) need to be activated. If other cells need to be activated, flow chart 730 branches back to step 736 to activate additional cells. If the user does not wish to create more cells, flow chart 730 branches to step 742, which starts the next phase (i.e., definition of relationships) of the design of an application.

In step 742, the user drags a first display window (other than the relationship window) created above to a desired location inside a second display window (again, other than the relationship window). The user then defines the relationship between these windows. This involves going into the relationship window to assign the first display window as the child of the second display window. Once a window is designated as the child of a parent window, the relationship cell causes the operating system to change the window to a child style (step 744). The underlying mechanism to perform this operation will be discussed below in connection with FIG. 4. A window in the child style has a predefined visual relationship with a corresponding parent window (e.g., in the MS Windows environment, the child window is confined within the boundary of its parent and cannot move outside). In step 746, the user determines whether additional relationship between windows need to be defined. If the answer is positive, flow chart 730 branches back to step 742 to define additional relationships. If the answer is negative, flow chart 730 terminates.

It should be pointed out that an application may contain a hierarchy of parent-child relationships. For example, a first window could be defined as the child of a second window, which could be defined as the child of a third window. In this case, the first window is bounded by the second window, which is in turn bounded by the third window. When the third window moves, the first and the second windows move with the third window. Alternatively, a parent may contain several child window at the same hierarchical level.

It should also be pointed out that the use of relationship cell and window is one of the methods for defining relationship among the cells. An alternative method is now described. As discussed in the section entitled "Detailed Description of the DCT", some of the cells (e.g., the visual and button cells) could be switched into an edit mode so that users can change the characteristics of cells by entering information in an edit window. When the cell is in the edit mode, a dialogue box is displayed. A user can click on various icons and enter alphanumeric characters in selected boxes. When the edit mode is switched off and the cell returns to an executing mode, the cell now takes on a new behavior defined by the information entered in the dialogue box. In one embodiment of the present invention, the dialogue box contains an icon for allowing a user to define a parent-child relationship (referred herein as a "relationship icon," for convenience).

FIG. 1B shows an embodiment of the present invention that does not require a relationship window. Instead, the above-described relationship icon is used. A user does not need to enter numbers in order to define relationships. Picture elements that are common in FIGS. 1A and 1B have the same reference numeral.

FIG. 1B shows a video cell in an edit window 707. It contains a relationship icon 716 for a user to indicate that this window should be a child window. Thus, the user can click on relationship icon 716 to allow the system to know that this window should be the child window of a soon-to-be determined parent window. The user then defines the parent window. For example, the user can move a cursor 720 to framing window 708 (e.g., by depressing a button of a mouse 722 and then moving the mouse). After cursor 720 is at an appropriate location inside framing window 708, the user releases the button to indicate that this is the desired location and framing window 708 should be the parent window. The user can then exit edit window 707. A new window, window 712, is generated inside framing window 708 while the original window of the video cell is cleared. Window 712 is set by the operating system as a child window of framing window 708. The underlying mechanism in creating this parent-child relationship will be described in detail in connection with FIG. 4.

Similarly, FIG. 1B shows a control cell in an edit window 709. This control cell communicates with and controls the visual cell using the same method described above in connection with FIG. 1A. Edit window 709 contains a relationship icon 717 allowing a user to indicate that this window should be a child window. The user can click on relationship icon 717. Cursor 720 is moved (by depressing a button of mouse 722) to an appropriate location inside framing window 708. The user then releases the button to indicate that the child window should appear at this location. After the edit window 709 is exited, a new window, i.e., window 714, is generated inside framing window 708. The original window associated with the control cell is cleared. Window 714 is set by the operating system as a child window of framing window 708.

Figure 3:
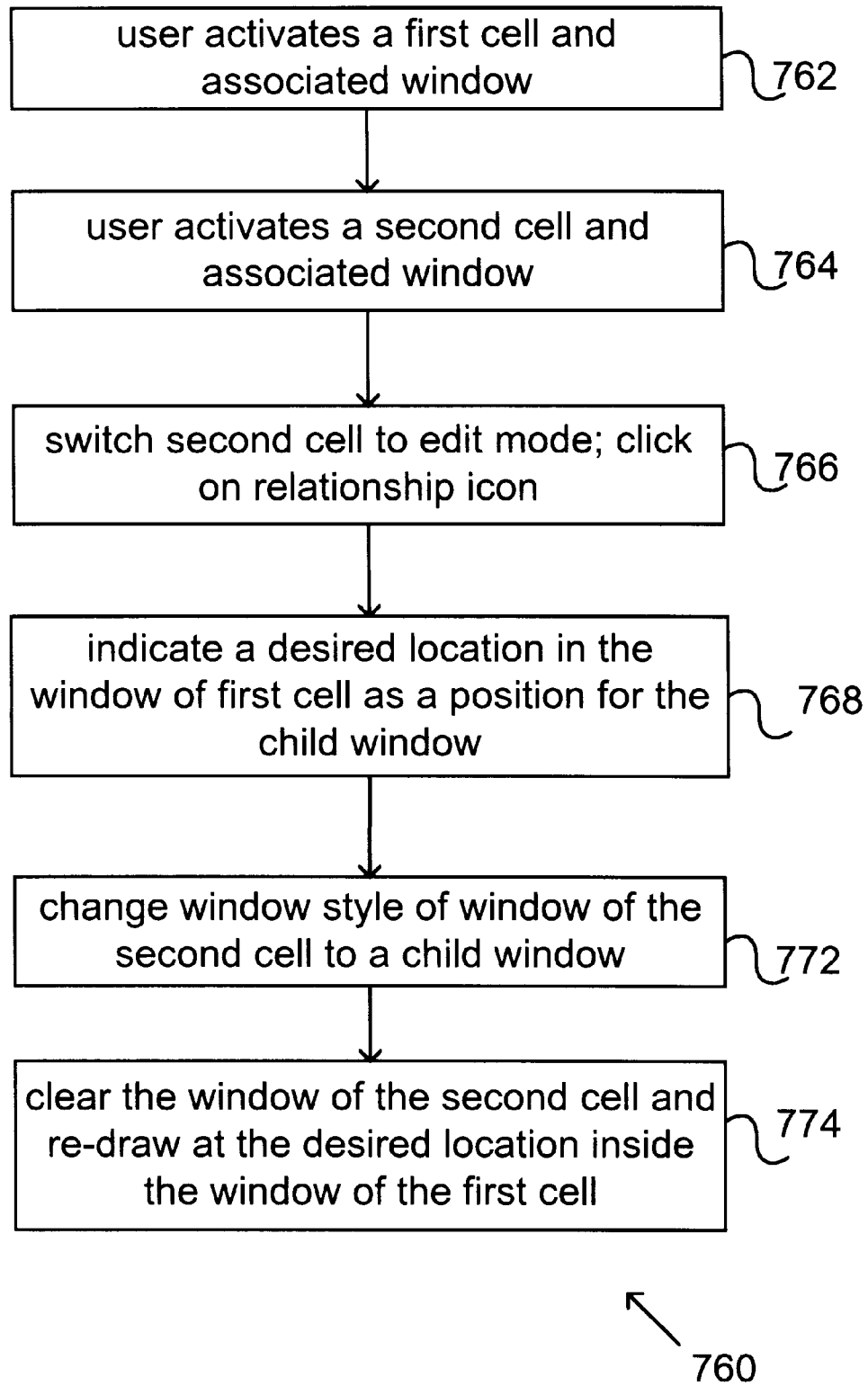
FIG. 3 is a flow chart of the steps that can be used in implementing the application illustrated in FIG. 1B.

FIG. 3 is a flow chart 760 summarizing the above described operation. In step 762, a user activates a first cell (which could be a visual, video, and other cells) and its associated window. This first cell will be chosen, for illustrative purpose in this example, as the parent window. In step 764, the user activates a second cell (which again could be a visual, video, and other cells) and its associated window. The user then switches the second cell to an edit mode. The relationship icon is clicked (step 766). The user then defines a new location of the child window by indicating this location inside the window of the first cell (step 768). In the above example, this location is indicated by moving a cursor thereto. The window style of the second cell is then changed to a child (step 772). The detailed mechanism for performing this step will be described below in connection with FIG. 4. The original window of the second cell is cleared and a child window at the desired location inside the window of the first cell is generated (step 774).

The steps described in flow chart 760 can be used to add other child windows to the window of the first cell (which becomes the parent window). In this case, the other child window would be at the same level as the window of the second cell. Alternatively, a child window can exist within another child window. If step 768 is modified such that the user indicates that the desired location is inside an existing child window, the newly created child window would be the child of the existing child window. Thus, this newly created child window cannot move out of the boundary of the existing child window, which in turn cannot move of the boundary of a parent window. As a result, a hierarchy of parent-child relationships can be created. As a further embodiment, a parent window could contain several child windows at the same level, and each or all of the child windows could contain additional child windows (which could be called the grand-children of the parent window). The grand-children could further contain child windows. There is no limitation to the levels of parent-child relationship in the present invention.

Figure 4:
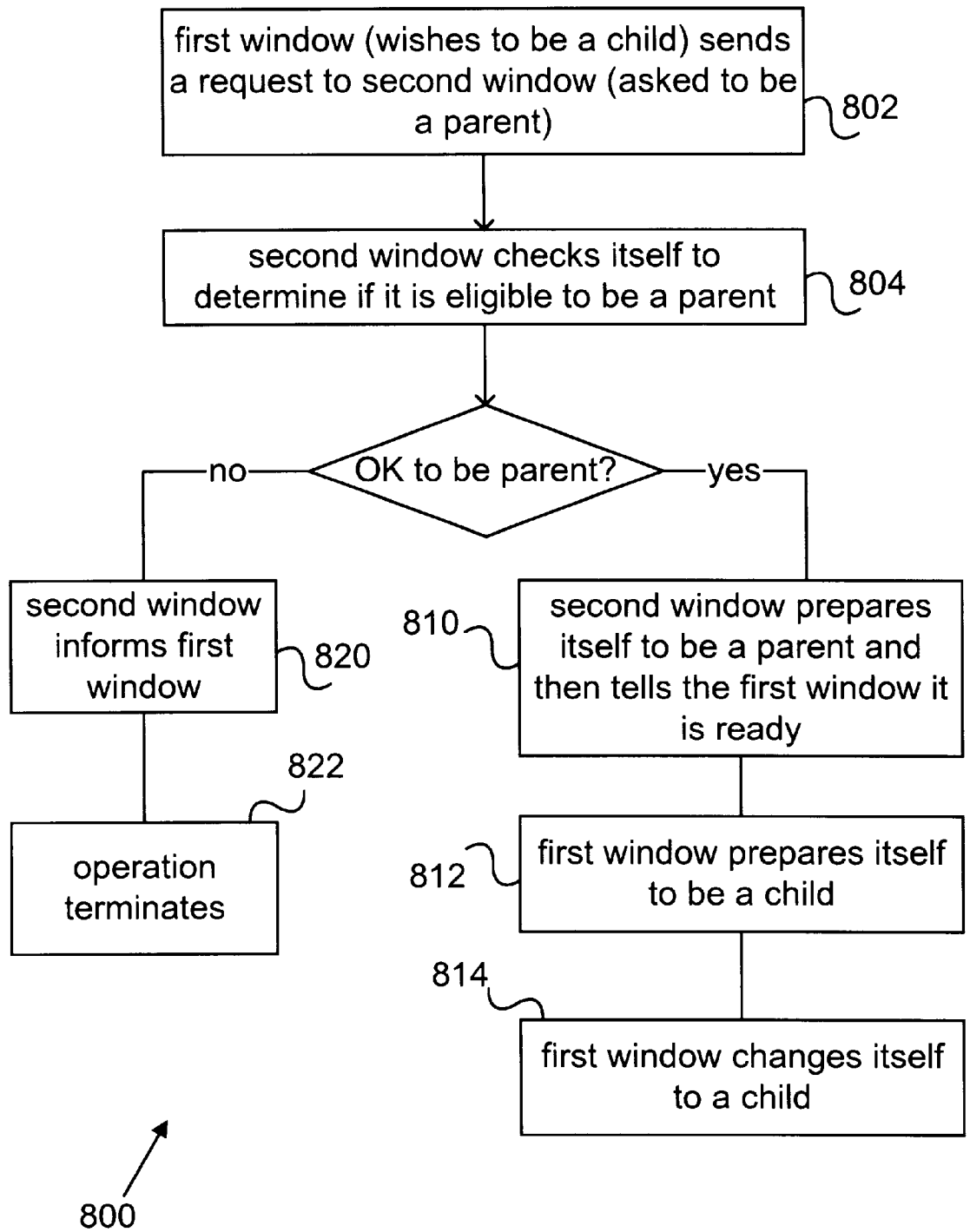
FIG. 4 is a flow chart showing the steps involved by two independent windows to form a parent and a child relationship in accordance with the present invention.

FIG. 4 is a flow chart 800 showing the steps in creating a child window. In flow chart 800, two windows are involved. The first window is the one that will be turned into a child window and the second window is the one that will be turned into a parent window. Prior to forming a parent-child relationship, these two windows could be entirely independent or could interact with each other under DCT or other program architecture. Upon receiving a command from the user that the first window should be the child, the first window sends an instruction (using, e.g., the protocol disclosed in section entitled "Detailed Description of the DCT" or the protocol disclosed in the incorporated patent application) to the second window requesting it to be the parent (step 802). In the preferred embodiment, this instruction includes the window handle of the first window. In step 804, the second window checks itself to determine if it is eligible to be the parent of the first window. If the answer is yes, flow chart 800 branches to step 810, in which the second window prepares itself to be a parent. In MS Windows environment, this step involves using a "SetWindowLong" function to prepare a "base window" of the second window. The second window then notifies (using, e.g., the protocol disclosed in the section entitled "Detailed Description of the DCT" or the protocol disclosed in the incorporated patent application) the first window. In a preferred embodiment, the window handle of the second window is passed to the first window. The concept of the "base window" is explained in FIG. 5A.

Figure 5A:
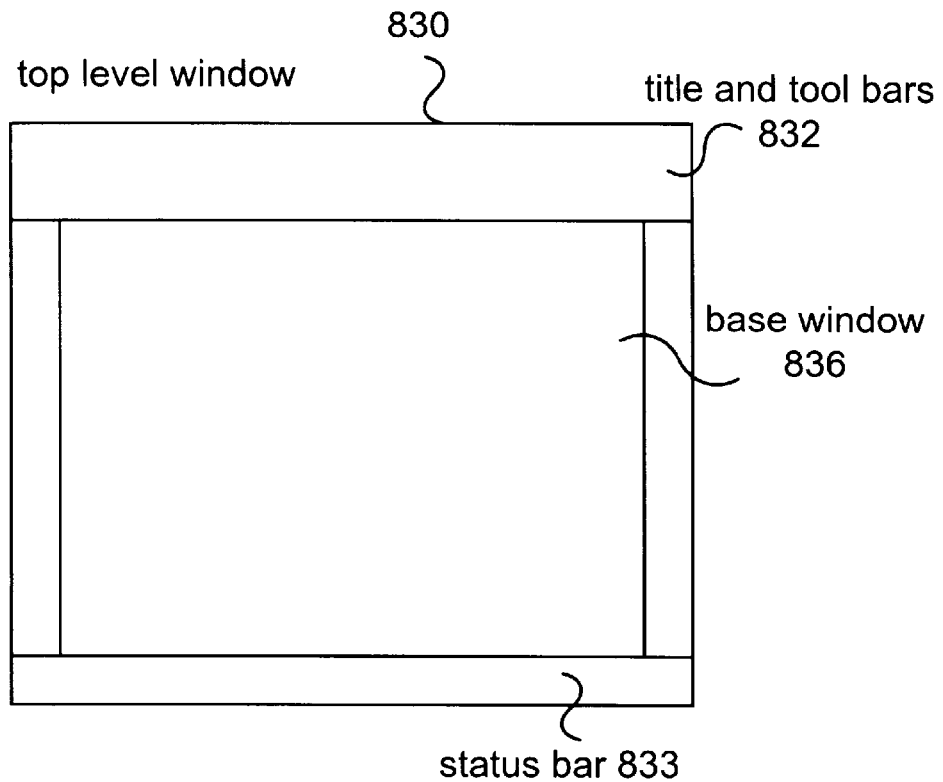
FIG. 5A is a drawing showing the components of a window that may be used in the present invention.

FIG. 5A shows the components of a typical window 830. In the present invention, this window is called the "top level window" because it includes all the components of the window. As an example, window 830 contains a region 832 for holding title and tool bars and a region 833 for holding a status bar. Regions 832 and 833 are created by MS Windows operating system. A base window 836 is a region (outside of regions 832 and 833) in which user-generated information (in the form of video, graphic, text, etc.) can be presented. The total composition (including base window 836 and regions 832–833) forms the "top level" window.

Figure 5B:
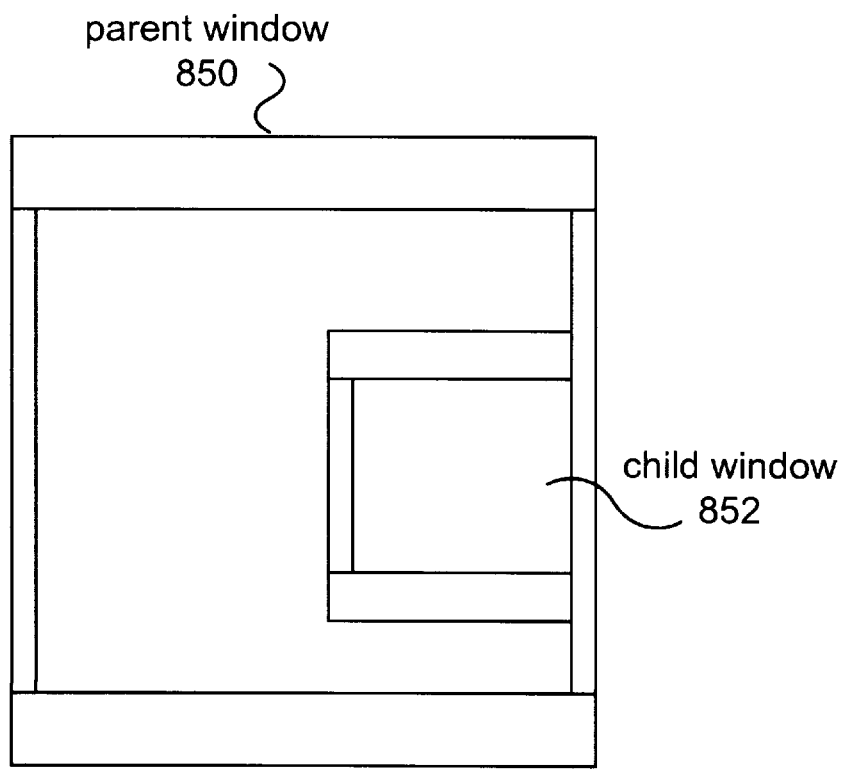
FIG. 5B is a drawing showing the relationship of a parent and a child window that may be used in the present invention.

When a child window (such as window 852 of FIG. 5B) is created inside a parent window (such as window 850 of FIG. 5B), a complete window (i.e., the top level window) needs to be created inside the parent window. On the other, only the base window of the parent is affected in creating a child window. That is the reason why step 810 affects only the base window of the second window.

Returning now to FIG. 4, the first window prepares itself to be a child window (step 812). In MS Windows environment, this step involves using a "SetWindowLong" function to prepare a top-level window of the first window. In step 814, the first window changes itself to be a child window. In MS Windows environment, this step involves using a "SetParent" function. This function performs the necessary redrawing and repainting of the child window.

The situation in which the answer to step 804 (i.e., the second window checks itself to determine if it is eligible to be the parent of the first window) is negative is described. In this case, flow chart 800 branches to step 820 in which the second window informs the first window of the negative result. Flow chart 800 then terminates.

The invention has been described with reference to a specific exemplary embodiment thereof. Various modification and changes may be made thereunto without departing from the broad spirit and scope of the invention. The specification and drawings are, accordingly, to be regarded in an illustrative rather than a restrictive sense; the invention is limited only by the provided claims.

Detailed Description of the DCT

Figure 6:
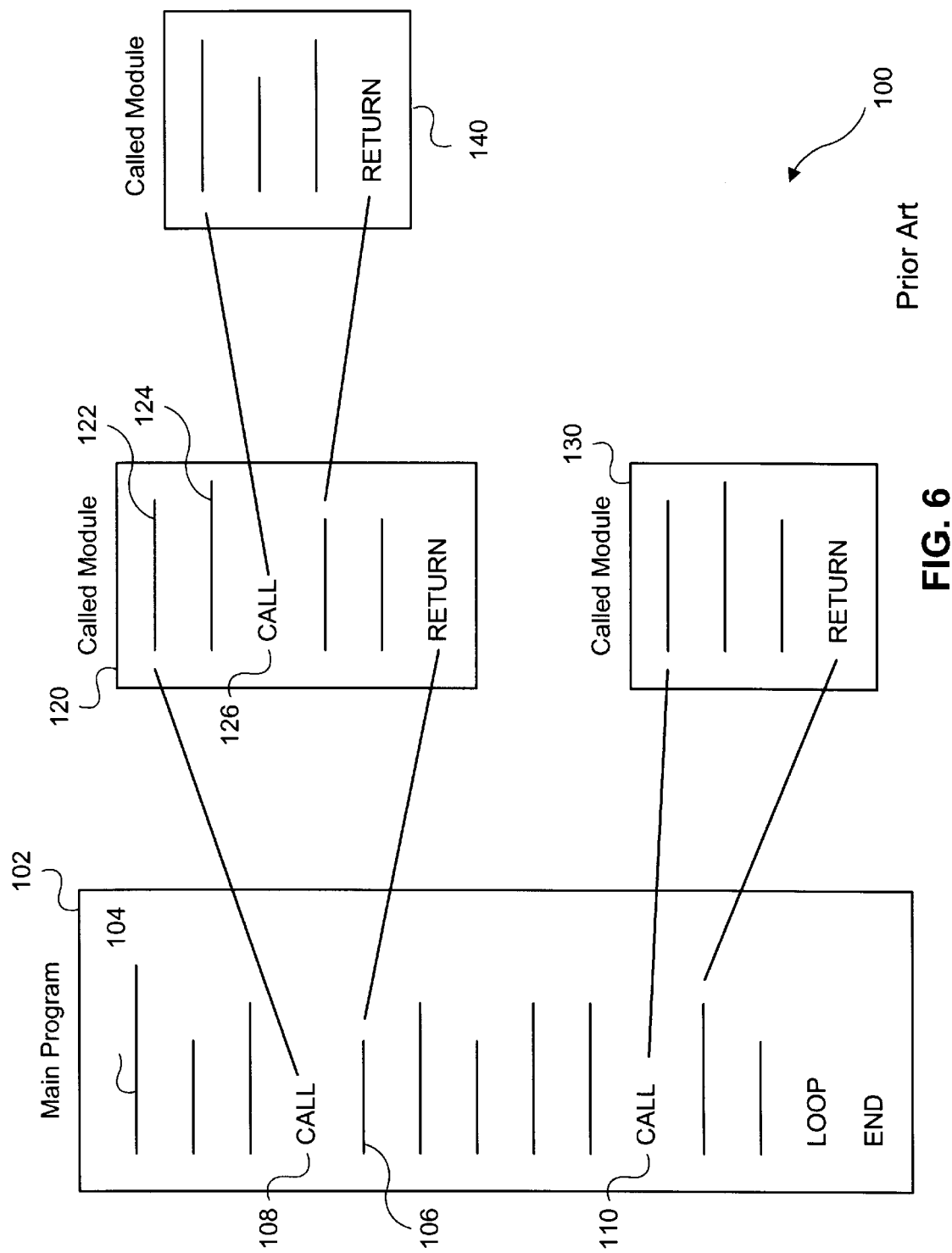
FIG. 6 is a diagram showing a prior art programming architecture.

Conventional computer program architecture consists of a main program and a plurality of program modules. The main program typically controls and coordinates the operation of the program modules. FIG. 6 is a schematic diagram of a program 100 having such an architecture. In FIG. 6, a main program 102 contains a plurality of statements, such as 104 and 106. Some of the statements could be CALL statements, such as statements 108 and 110. These two CALL statements, when executed, will invoke program modules 120 and 130. Main program 102 may contain a LOOP statement which causes main program 102 to execute continuously in a loop. Main program 102 also contains a STOP statement for terminating the program. It should be appreciated that program 100 could be written in different programming languages, and the precise syntax of the statements and program structure could vary with the programming languages.

Program 100 contains a plurality of program modules, such as modules 120 and 130, called by main program 102. Module 120 contains a plurality of statements, such as statements 122 and 124. It could also contain a plurality of CALL statements, such as statement 126. This statement, when executed, will invoke another module 140. Finally, module 120 contains a RETURN statement.

When CALL statement 108 is executed, main program 102 jumps to module 120. Statements 122, 124 and the rest of the program are executed. Upon executing the RETURN statement in module 120, program 100 returns to statement 106, which is the statement following CALL statement 108. At this time, the control of program 100 is returned to main program 102. Main program 102 continues to execute.

The structure of all the modules is similar to that of module 120. Similarly, the jump-return mechanism, described above, is carried out by all the CALL statements in program 100. Consequently, they will not be further described in this specification.

In order to carry out this jump-return mechanism, the return addresses of the CALL statements need to be saved in RAM (typically in a memory structure called a stack). Other essential state information of the computer prior to jumping to the called module, such as values of registers, may also be saved if there is a need to do so (e.g., when jumping to an interrupt service routine). Thus, when main program 102 calls module 120, the contents of these registers may also be pushed (i.e., saved) in the stack. Similarly, when module 120 calls module 140, the return address of module 120 also needs to be saved. The contents of appropriate registers may need to be pushed in the stack. Thus, the size of the stack could be large when a large number of CALL statements are executed.

When a RETURN statement is executed, the return address is used to return to the calling program. The saved information is also retrieved.

Typically, a program in the above described conventional architecture contains many CALL statements and many modules. These modules could call other modules (e.g., module 120 can call module 140), thereby forming a chain of CALL statements. The precise history of this chain needs to be preserved so that the last called module can return to the main program. One of the problems of the conventional architecture is that the time to travel the chain could be very long. As pointed out above, each time a CALL statement is invoked, certain amount of state information needs to be saved, resulting in overhead in execution. Each time a RETURN statement is executed, the saved information needs to be restored, again requiring overhead in execution. As a result, the execution speed of programs written using conventional architecture is slow.

The following are some of the characteristics of the conventional architecture: (a) there is a controlling ("boss") program, e.g., main program 102, (b) all the linkage information (e.g., return address and registers) needs to be preserved when one part of the program (a calling program such as main program 102 or some of the modules) transfers execution to another (the called program), and (c) the linkage information is used to return control and information to the calling program. This architecture could be called a "boss" architecture. The calling module can be considered a master while the called module can be considered a slave executing commands issued by the master and then reporting results to the master.

Recently, other programming architectures have been developed. However, they are also based on the boss architecture. One example is object-oriented programming. This method allows codes to be reused and applications developed relatively rapidly. However, the applications still have a controlling body which adds tremendous overhead.

Advances in program architecture have also been made in operating environments. One example is an interprocess communication protocol called dynamic data exchange (DDE) used in Microsoft's MS Windows environment. DDE uses a shared memory to exchange data between processes and a protocol to synchronize the passing of data. The heart of DDE protocol is the DDE message. A process (client) can ask another process (server) to perform a service. Specifically, the client issues a WM_DDE_EXECUTE message to post a command to the server by storing a command string in a global memory block and passing to the server a handle to the global memory block. The server subsequently returns a WM_DDE_ACK message to the client. If the server successfully executes the command, the WM_DDE_ACK message would return a TRUE value to a DDEACK structure member labelled "fAck." If the command is not successfully executed, the server posts a WM_DDE_ACK message with "fAck" set to FALSE. When the client receives the WM_DDE_ACK message from the server, it deletes the command string from global memory and proceeds to take appropriate actions accordingly.

It is clear that interprocess communication via DDE has many characteristics of the conventional architecture shown in FIG 6. Specifically, the preservation of linkage information and the return of control to the client are important aspects of DDE. While the architecture of FIG. 6 stores the content of a few registers and the return address in each interprocess communication, DDE uses elaborate commands and data structure. As a result, DDE is even less efficient than the architecture of FIG. 6.

Another example of new developments in operating environment is an architecture used in MS Windows called OLE (Object Linking and Embedding). This architecture allows one application (e.g., a word processor program) to be linked to one or more applications (e.g., a spreadsheet program). In the terminology of OLE, applications can be classified as client applications and server applications. MS Windows uses a "registration database" to maintain a collection of information about OLE applications and file extensions for MS Windows applications. All communication between applications is handled by OLE. Specifically, OLE applications communicate through the use of three dynamic-link libraries: OLECLI.DLL, OLESRV.DLL, and SHELL.DLL. The SHELL.DLL enables applications to communicate with the registration database. The OLECLI.DLL is the OLE client library and the OLESRV.DLL is the server library. The OLE server and client libraries communicate with each other through DDE messages. The typical path of communication for an OLE function includes the call of the function, DDE messages between OLE libraries, and disseminating information to the client and server applications.

In one example, when the OLESRV.DLL library receives notification from the OLECLI.DLL library that a client application needs an object, the OLESRV.DLL library calls appropriate server methods. For example, OLESRV.DLL calls a ServerOpen() method when a user activates an object in an OLE client application. The server application then performs the operation of the ServerOpen() method. If ServerOpen() is performed successfully, the method returns OLE_OK. If ServerOpen() is not performed successfully, an OLE_ERROR_OPEN is returned. The client application can then take appropriate actions.

The registration database in OLE contains the linkage or history of the applications. The registration database and the client-server structure of OLE form a boss architecture. Further, even a simple communication between applications requires the involvement of many Windows components (e.g., DDE, dynamic-link libraries, etc.). It is well-known that MS Windows applications require a lot of memory and processor bandwidth. The boss architecture together with the complicated structure of MS Windows' components could be one reason for the slow performance.

Figure 7A:
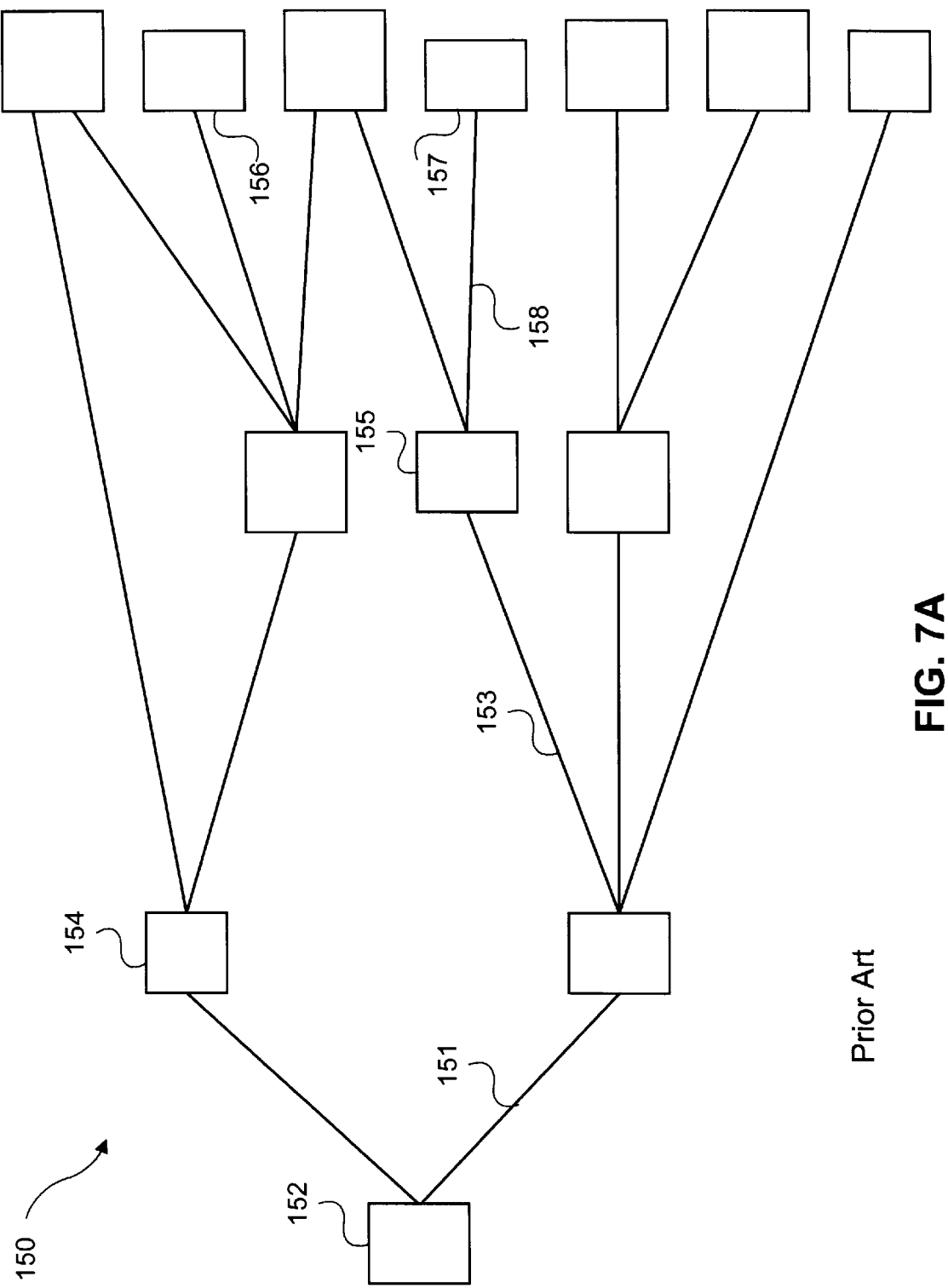
FIGS. 7A and 7B show a comparison between prior art architecture and the architecture of the present invention.
Figure 7B:
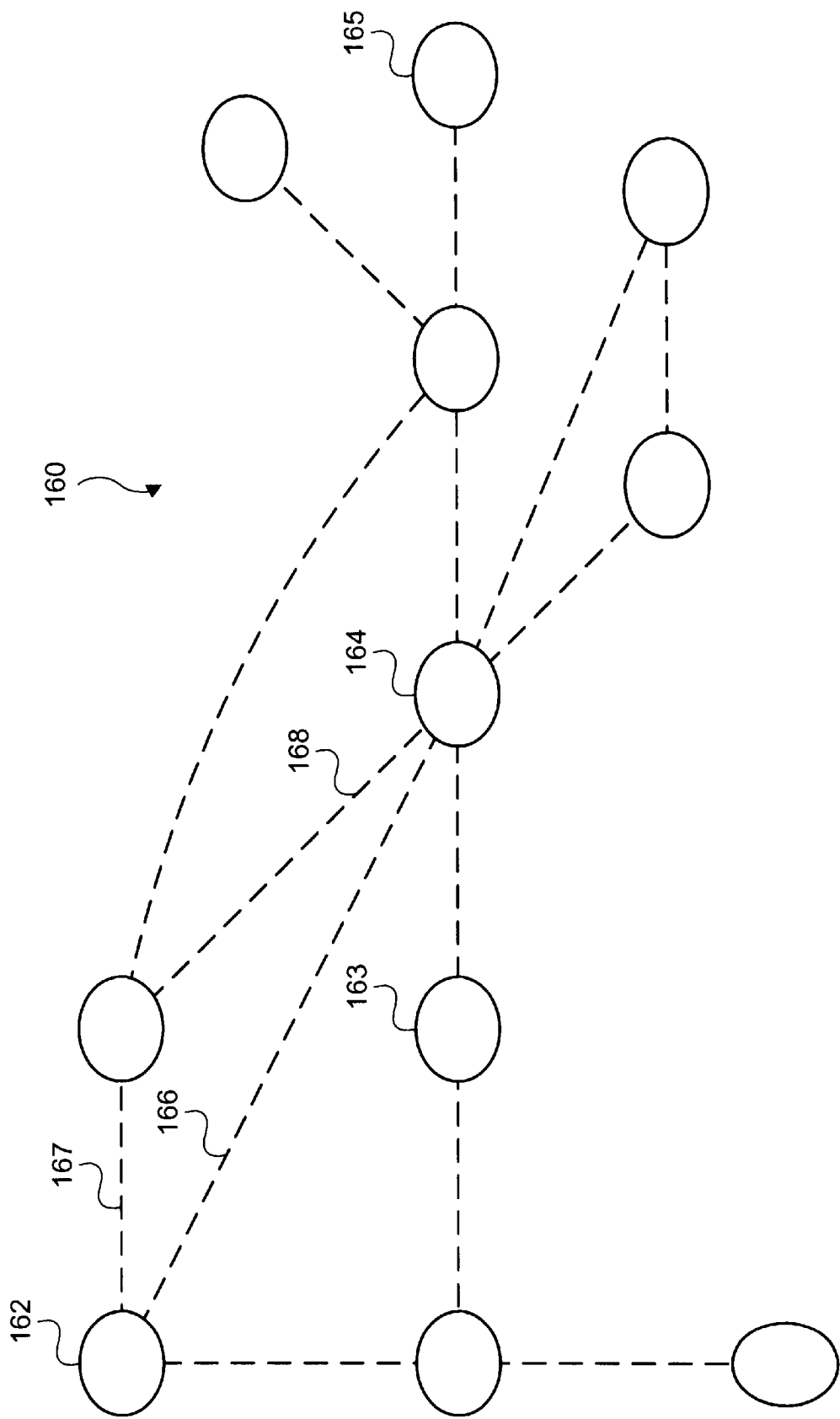

The architecture of the present system is called a "bossless" architecture because every program module is on equal footing with other program modules. There is no module that controls the overall operation of the program (i.e., no boss). A comparison of the bossless architecture and the boss architecture is shown in FIGS. 7A and 7B. FIG. 7A is a schematic view of an application 150 based on the boss architecture. The architecture is in the form of a hierarchic structure, and a boss module 152 controls a plurality of modules, such as modules 154–157. Solid lines running from the boss to the individual modules are used to graphically depict the chains of command and linkage. When a program module in the lowest level (i.e., module 157 at the end of a branch) is executing, solid lines (i.e., links) 151, 153 and 158 from the boss to that program module must be maintained. FIG. 7B is a schematic view of an application 160 based on the present bossless architecture. Application 160 comprises a plurality of program modules, such as modules 162–165. Each program module (called a "cell" in the present architecture) is the same as the other cells in an hierarchical sense. Cells are linked together in a novel way in which no history or linkage information needs to be retained. Each link is independent. For example, there is no need for links to be active simultaneously. Each link is direct, i.e., two cells can be linked directly without the need of using one or more intermediate links. For example, cells 162 and 164 can be linked directly using line 166 instead of using lines 167 and 168 and passing through an intermediate cell. An application can be formed by defining the cells involved and using the novel link of the present architecture. This is different from the situation in FIG. 7A where the link from the boss to the module at the lowest level must be active at all time while the module is executing. In FIG. 7B, dashed lines are used to graphically depict the novel interaction of the present architecture.

Figure 8:
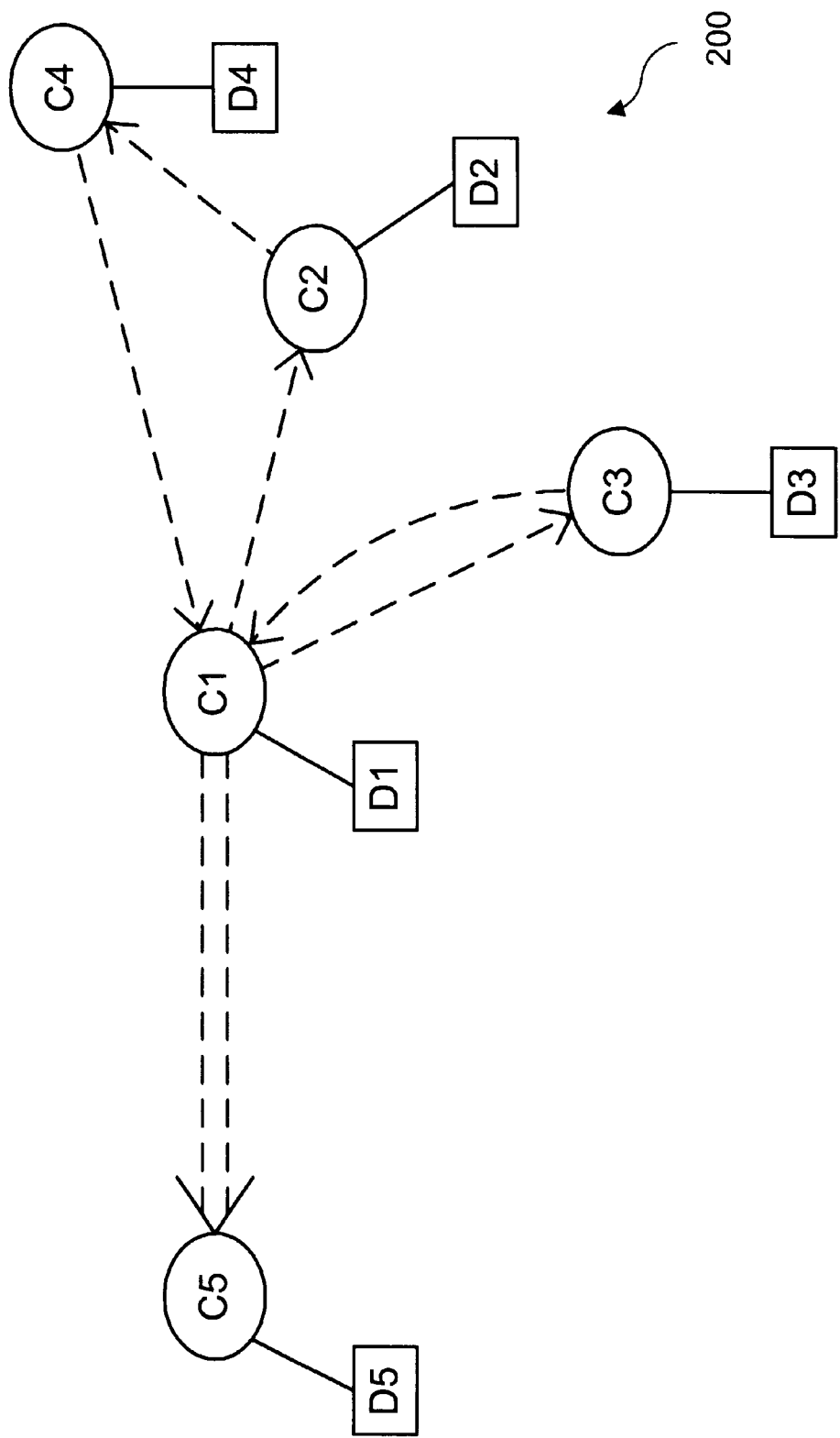
FIG. 8 is a diagram showing the interaction of cells in accordance with the present invention.

FIG. 8 is a drawing showing the structure of an application 200 using the bossless architecture of the present architecture. Application 200 contains a plurality of cells, labeled as C1–C4, loaded and executing in RAM. Each cell has an associated file (labeled as D1–D4), called DNA file, which contains information of the cell. The term "DNA" is used here in analogy with the biological relationship between a living cell and its DNA. At a desired time, cell C1 can send statements (called "DSF statements") to cell C2 using a protocol called digital shifting function ("DSF") protocol. Cell C2 will execute these statements. The detail structures of cells, DNA files and the DSF protocol will be described below.

One important distinction of the present architecture from conventional inter-process communication is that cell C2 does not retain information on the origin of these statements, i.e., no history of the inter-process communication is kept. Thus, once cell C1 completes its writing of DSF statements to cell C2, there is no further linkage between cells C1 and C2. Cell C2 does not know the origin of these statements during their execution. It is possible for cell C1 to later establish communication with cell C2 again by sending another set of statements to C2. However, this communication is separate from the previous communication, and terminates once the new set of DSF statements is sent.

Each of the cells can send DSF statements to any of the cells it desires. Thus, cell C1 can also send statements to cell C3. Similarly, cell C2 can send statements to cell C4, which in turn can send statements to cell C1. Cell C3 can also send statements to cell C1.

In this example, cells C1 and C2 are not bosses to C4. For example, when C4 is executing DSF statements, there is no need to maintain any links between cells C1 and C2 and between cells C2 and C4. Cell C4 has no obligation to report results of execution to any cells in application 200. Links are maintained only during the time DSF statements are transferred. Further, the writing of statements by cell C1 to cell C2 could be independent of the writing of statements by cell C2 to cell C4. In addition, cell C4 merely execute statements, and does not care where the statements come from. In FIG. 8, dashed lines are used to graphically depict the novel relationship between cells.

As pointed out above, one of the problems of the conventional architecture is that excessive amount of linkage information is retained, thereby slowing down the execution of programs. In the present architecture, there is no need to save and restore register values on a stack when cell C2 executes statements written by cell C1. There is no need to register cells in a central database prior to sending commands. There is no need to send messages back and forth to report status of execution. As a result, the application can be executed quickly.

Because there is practically no overhead in linking programs, it is possible to design an application using a large number of small cells. In a preferred embodiment, the size of the cells are small, e.g., typically about 10 kilobytes. The function of each cell is well defined and focused. As a result, there is flexibility in designing applications and the efficiency in execution improves.

A cell can also invoke another cell (e.g., cell C1 can invoke cell C5, as indicated by the double dashed line), if that cell is not already loaded and running in RAM. The invoked cell (i.e., cell C5) could be completely independent of the invoking cell (i.e., cell C1) after invocation. Thus, the invoking cell is not the boss of the invoked cell and the two cells are hierarchically at the same level. This is completely different from the prior art in which an invoking program module is at a hierarchical different level as the invoked program module.

As explained below, a cell can be implemented as an ".EXE" file (in the MS DOS or MS Windows environment), and can be loaded into RAM for execution using well known methods in accordance with the operating environment. The cell's associated DNA file can also be loaded into RAM. The invoked cell takes on the attributes stored in its DNA cell. It is also possible to modify the DNA file when the cell is invoked or while running by writing to the file (which could be an ASCII file). As a result, the architecture provide a flexible approach to build applications.

It can be seen from FIG. 8 that the bossless architecture has a flat structure instead of a hierarchical architecture of FIGS. 6 and 7A. Each of the cells C1–C4 is an independent executable routine which is at the same hierarchical level as other executable routines. No cell functions as a boss for other cells. Consequently, this architecture is called a bossless architecture.

This architecture allows an application to start at any cell. Other cells can be invoked as needed. This architecture also allows an application to end at any cell. Because there is no chain to unwind, the cells can terminate immediately. There is no need to return to the "boss" program before exiting the application. In one embodiment of the present architecture, a cell can exit the application at a predetermined time after invocation of a new cell. In another embodiment of the present architecture, other cells can send a DSF statement to this cell requesting it to terminate.

Figure 9:
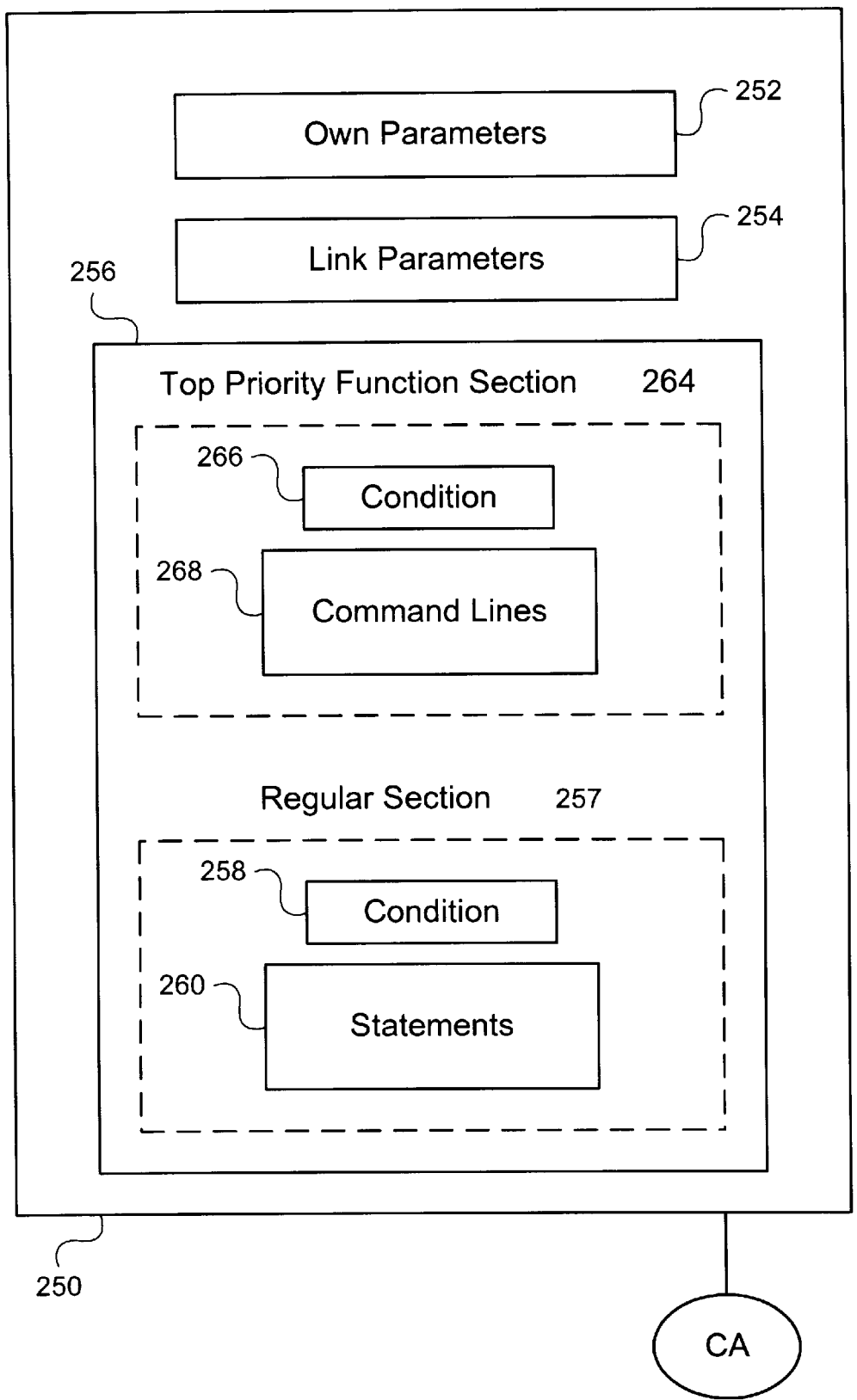
FIG. 9 shows a block diagram of the structure of a DNA file in accordance with the present invention.

FIG. 9 is a block diagram showing the logic structure of a DNA file 250 associated with a cell, such as cell CA. File 250 has a section 252 containing parameters ("own parameters") related to the characteristics of cell CA itself. For example, section 252 may contain parameters related to the way cell CA manifest itself when invoked: the window size and background color of cell CA, the name of cell CA, the names of audio files associated with its invocation and termination, etc.

File 250 also contains a section 254 containing linking parameters ("link parameters") on cells related to cell CA. Examples of the parameters contained in this section are: the names, symbols and positions of the other cells. One of the parameter is "close," which is interpreted as closing cell CA when the cell associated with this parameter is invoked.

File 250 further contains a DSF information section 256. This section contains a regular statements section 257 and a top priority function section 264. The structure of the regular section 257 and top priority function section 264 are substantially the same, except that top priority function section 264 has a higher priority in statement execution. These two sections contain individual headers for identifying the sections (e.g., each section headed by a different name or symbol).

Regular section 257 contains a "condition" section 258 and a statements section 260. Statements section 260 comprises DSF statements sent to cell CA by other cells. Statements in statements section 260 are executed sequentially. Examples of statements are "Draw Circle," "Draw Line," and "Scrolling."Each statement also contains parameters necessary for the execution of the statement (e.g., location and diameter of circles). Condition section 258 comprises three components: (a) a first pointer to the last DSF statement currently existing in statements section 260, (ii) a second pointer to the current DSF statement being processed by cell CA, and (iii) the current status of the cell. Examples of status are: ready, busy, lock, and never.

Top priority function section 264 contains a condition section 266 and a command lines section 268. The structure of condition section 266 is similar to the structure of condition section 258 (e.g., both sections contain two pointers). Command lines section 268 contains executable command lines which are sent by other cells using DSF (or similar) protocol. The command lines have a higher execution priority than the statements in statements section 260 (the details of execution priority will be discussed below in connection with FIG. 10). The command lines in command lines section 268 are executed sequentially. Examples of commands in section 268 are close, min (for minimizing a window), max (for maximizing a window), restore, etc.

It should be appreciated that the logic structure shown in FIG. 9 can be implemented using one or more physical files. Further, portions of the logical sections may intermingle physically. In one embodiment of the present architecture, the DNA file is a text file. Thus, the content of the DNA file can be modified by using a regular text editor.

Statements sent by one cell to another follow the DSF protocol. A sending cell (e.g., cell CS) sets up a communication link with the DNA file 250 associated with cell CA. Specifically, it looks up the address of DNA file 250 and determines whether DNA file 250 is able to accept DSF statements (e.g., at a "ready" state) by examining its status in condition section 258. Statements will be issued by cell CS only when cell CA is ready to accept them. In one embodiment, the issuance of statements involves writing ASCII characters (e.g., the ASCII characters for "Draw Circle") to statements section 260 of DNA file 250.

When cell CS is authorized to issue statements to cell CA, cell CS reads the first pointer (in condition section 258) to the last DSF statement to determine the appropriate address to write the DSF statements. It is important not to overwrite DSF statements already existed in cell CA. Cell CS writes DSF statements to statements section 260 of DNA file 250. Cell CS also updates the first pointer in condition section 258 so as to point to the last DSF statement newly written into statements section 260. The communication link between cells CA and CA is terminated. It can be seen that cell CA and DNA file 250 do not maintain record (i.e., history) indicated that these new statements originate from cell CS.

It should be appreciated that the above described DSF protocol is only an exemplary protocol. Other protocol could be used to write DSF statements to cells. For example, different pointer structures can be used, e.g., the first pointer can point to the position after the last DSF statement. Different types of status and different ways for checking status information can be used. Further, the statements could be stored in accordance with a logic structure instead of stored physically in a sequential manner. For example, the statements could be organized into groups with the address of each group pointed to by a pointer.

Command lines are sent by one cell to another using a protocol substantially the same as the DSF protocol. Because regular statements section 257 and top priority function section 264 have different headers, the sending cell can distinguish between these two sections and write to the appropriate section. Other means for identifying these two section cam also be used (e.g., maintaining separate linked lists of statements and command lines).

Because DSF statements/commands are executed sequentially (either physically or logically), cell CA needs to complete execution of statements/commands (if any) preceding the above mentioned statements/commands written by cell CS. This set of previously written statements/ commands are likely to be written by other cells (although it is also possible that it is written by cell CS in a prior communication link).

After the set of previously written statements/commands has been executed and prior to the execution of the statements/commands written by cell CS, cell CA does not have to take any action with respect to the cell which wrote the first set of statements/commands (e.g., no "return" is needed). This aspect of the present architecture is different from conventional programming architecture.

Note that the communication link between cells CA and CS can be terminated prior to the execution of the first statement/command sent by cell CS (for example, the previously written DSF statements/commands have not yet be executed completely when cell CS finishes sending DSF statements to cell CA). This is different from conventional linking in which communication link between two program modules is completed only after the task relating to these two modules is executed completely.

In a different embodiment of top priority function section 264, command lines section 268 allows only one command. In this embodiment, there is no need to have pointers. Thus, condition section 266 can be removed from top priority function section 264. Other cells can write a single command to top priority function section 264 because this section is separated from other sections by a header.

Figure 10:
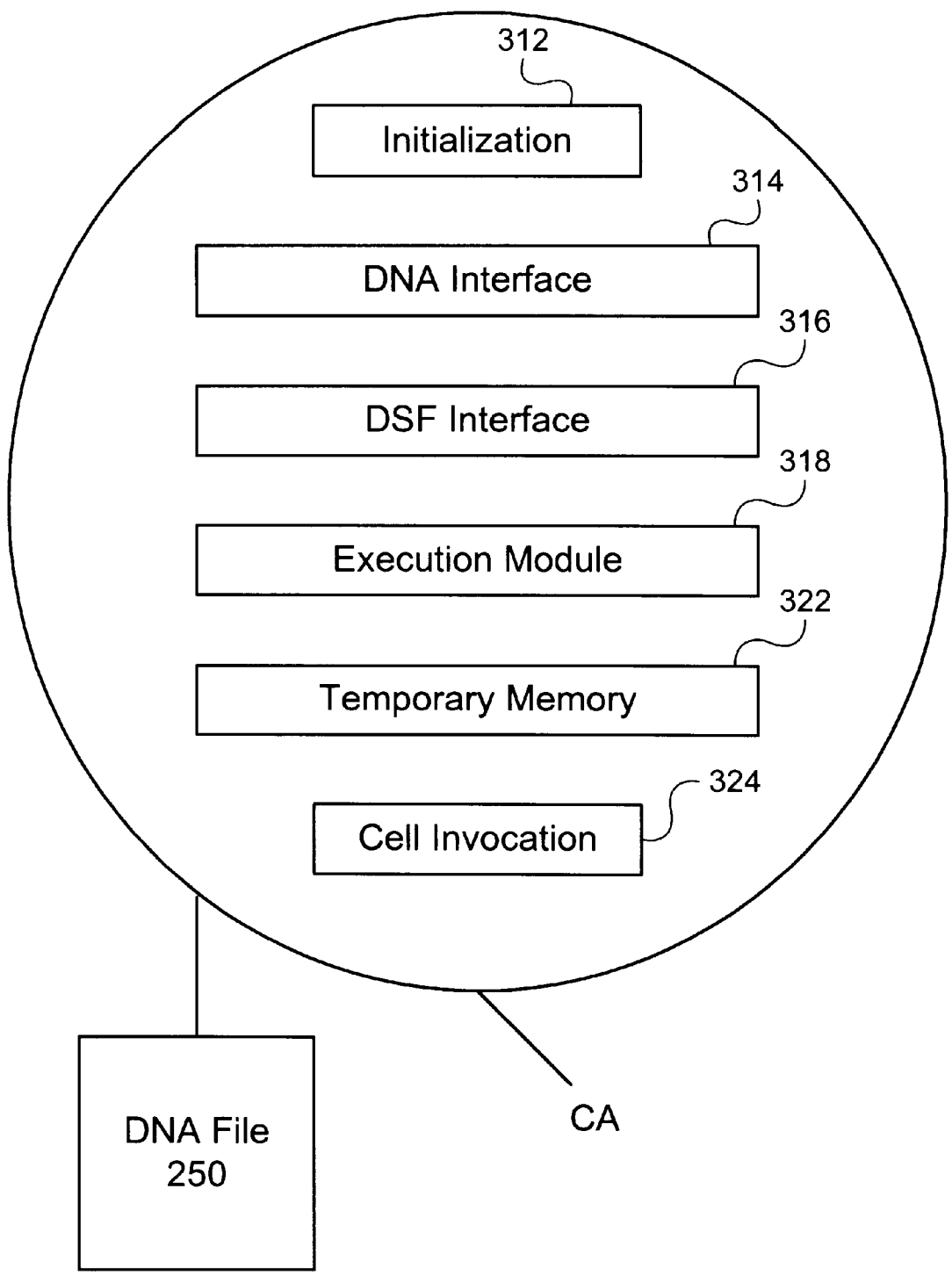
FIG. 10 shows a block diagram of the structure of a cell in accordance with the present invention.

FIG. 10 shows the structure of cell CA. It is grouped logically into a plurality of sections, each implemented using instructions executable by a computer. Cell CA contains an initialization section 312 and a DNA interface section 314. DNA interface section 314 allows cell CA to read from and write to its corresponding DNA file 250. Initialization section 312 takes care of housekeeping tasks when invoked, including reading parameters from "own parameters" section 252 of DNA file 250. Cell CA also contains a section 316 for processing DSF protocol. This section contains code (or program instructions) for sending and receiving statements/command lines using the DSF protocol.

Cell CA contains an execution section 318 containing code for automatically executing statements and command lines in DNA file 250 written by other cells. The code sequentially read and execute statements in statements section 260 of DNA file 250. After each statement is executed, cell CA branch to top priority function section 259 and executes all the command lines therein. Cell CA then executes the next statement in statement section 260.

An example is used to illustrate the execution steps. In this example, statements section 260 contains two statements, "Draw Circle" and "Draw line," while the top priority function section 259 contains one command line, "Max". When cell CA reads a "Draw Circle" statement and its associated parameters, the code will perform a graphic algorithm for drawing a circle at an appropriate place with an assigned diameter (as determined by the associated parameters). Cell CA then branches to top priority function section 259 and executes the "Max" command, which causes a window associated with cell CA to enlarge. Cell CA returns to statements section 260 and executes the next statement, i.e., the "Draw Line" statement. Cell CA executes a graphic algorithm which draws a line in accordance with the parameters associated with the "Draw Line" statement.

In the above example, if the command line in top priority function section 259 contains a "Close" command, cell CA will close itself. In this situation, the "Draw Line" statement will not be executed.

In one embodiment of the present architecture, cell CA reads statements section 260 at predetermined times regardless whether statements are present in DNA file 250 (i.e., similar to a polling arrangement). In another embodiment of the present architecture, a cell sends a signal to cell CA, either directly or indirectly (e.g., through an operating system), after sending statements to DNA file 250. Upon receiving the signal, cell CA executes the statements in statements section 260 until all the statements have been executed. Cell CA then waits for another signal. This embodiment is similar to an interrupt arrangement. Thus, the execution of statements is carried out automatically in both embodiments.

Cell CA contains a temporary memory section 322 for storing temporary information. As an example, it is possible to change attributes (e.g., background color and the size of the display window) of cell CA during its execution. In one embodiment of the present architecture, the changed attributes are temporarily stored in temporary memory section 322 instead of immediately being written to DNA file 250. In this embodiment of cell CA, the attribute information stored in temporary memory section 322 is written into "own parameters" section 252 of DNA file 250 only when cell CA is terminated.

Cell CA also contains a cell invocation section 324 for invoking other cells. In one embodiment of the present architecture, this section obtains information about the cell desired to be invoked and pass this information to a specialized cell which actually invoke the desired cell. It is also possible to incorporate the functionality of this specialized cell in the cell invocation section of cell CA and other cells.

It should be appreciated that the above mentioned sections in cell CA are grouped logically, and portions of these sections could intermingle physically.

It can be seen from the above described structures of cell CA and its associated DNA file 250 that both cell CA and DNA file 250 do not keep track of the origin of the DSF statements. A cell may accept DSF statements (stored in its associated DNA file) from many cells. After the DSF statements have been received, the linkage between the originating and destination cells is terminated. The cell executes DSF statements contained in its associated DNA file without knowledge of how the statements arrive the DNA file. As a result, there is no need to "return" to any cell.

Typically, the size of each cell is small and the function of the cell well defined. Consequently, the execution speed is fast. As a result of the small size and specialized function, the cells can be easily written to fully utilize the resources of a computer. The communication between cells using DSF is direct, with minimum amount of access to the operating system on which an application is run. As a result, the efficiency is high.

The present architecture comprises at least two cells which can communicate with each other. The cells are encapsulated program modules that are specialized for their designed tasks. Therefore, applications developed using the present architecture comprise of multiple executables which can run independently or concurrently. The cells interact with each other using the inventive DSF protocol. Each cell can control the action of other cells. For example, a first cell can control a second cell, and the second cell can control the first cell. Therefore, no single cell has complete control over the other cells, or in other words, there is no boss. On the other hand, under conventional architectures, program modules subordinate to a boss cannot control the boss. Another unique characteristic of the present architecture is that the cell that receives a command does not keep any information of where the command came from. This lack of historical knowledge allows cells to move forward instead of going backward in a link.

The technology of the present system is called the "digital cell technology" because the structure of program modules and the interaction between them are similar to biological cells. Some of the similarities are listed here: (i) an application is made up of many cells dynamically interacting with each other, (ii) many cells can be active at a time, (iii) the interaction of a pair of cells can be independent of interaction of other pairs of cells, (iv) control is distributed instead of centralized, and (v) each cell is associated with a DNA structure which guides the behavior of the cell.

One of the embodiments of the present architecture is a multimedia application development system which runs under Microsoft's MS Windows. In this environment, cells are programs stored as ".EXE" files and typically show a window on a computer monitor when invoked. By linking these cells, a user can construct an application software just like assembling blocks. Each cell, with its specific function, is given another function or value through DSF protocol with other cells to produce a variety of applications.

Figure 11:
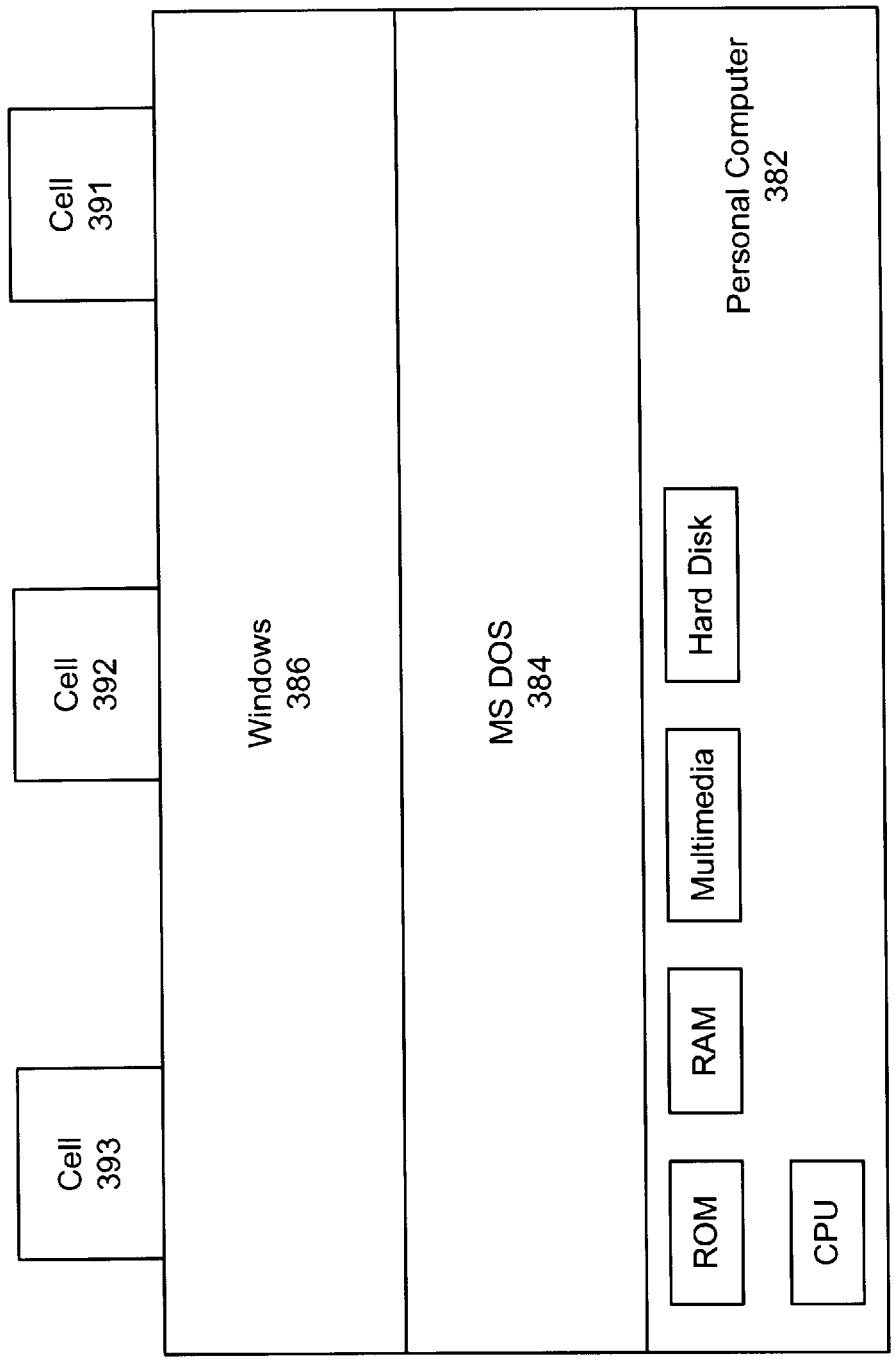
FIG. 11 is a block diagram of a computer system running an application in accordance with the present invention.

FIG. 11 shows a block diagram of a computer system 380 running the above described application development system. Computer system 380 comprises a personal computer 382, such as an IBM compatible computer. Personal computer contains components such as a CPU, RAM, ROM, hard disk and multimedia device (e.g., sound card, CD-ROM reader, video card, etc.). Personal computer is loaded with a MS-DOS 384 and a MS Windows 386. Cells 391–393 of the present architecture run on top of MS Windows 386. Some of these cells can be graphically displayed on a display device and played on a sound card of personal computer 382.

An exemplary list of cells which run under MS Windows environment together with a description of their functions is given below:

NAME DESCRIPTION

BUTTON: Creates buttons with action attributes assigned to them.

VIDEO: Enables video file (AVI) playback.

CONTENTS: Displays text files (TXT) (text editor with ability to adding action attributes to the text).

VISUAL: Enables display of BMP, DXF, TIFF, WRI, and TXT files with dynamic 360-degree free scrolling, multiple layer support, raster and vector overlays, and object overlays with action attributes assigned.

NAKAMA: Enables more than one VISUAL cells to be linked using coordinates. Enables images in two VISUAL cells to be interlocked using an interlinked window (bird's eye view).

RUN: DNA file editor and DNA file executor. Enables continuous reproduction of applications. This cell serves as the specialized cell, mentioned above, for invoking other cells.

COPY: Performs file copying.

TITLE: Executes Title Bar functions.

RESTART: Provides user selection to exit or restart the operating system.

PLAYWAV: Enables sound file (WAV) playback.

AREA: Manipulates the attributes of graphics written in the VISUAL cell.

LIST: Enables objects/layers to be grouped and provides instant access to the defined grouping.

These cells are stored in memory (e.g., floppy and/or hard disk) as ".EXE" files. To effectively allocate system resources for simultaneous activation of more than one cell, the sizes of most cells are around 10 kilobytes. The exception is the VISUAL cell which is about 100 kilobytes.

A simplified example will be used to illustrate the system. Only one type of cell, the visual cell, described above, is used in this example. In this example, the system makes use of the resources of MS Windows. For example, the invocation of a cell (e.g., loading of an appropriate file as a result of clicking on an icon) and the graphic user interface (e.g., the manipulation of windows such as resizing, drag and drop, etc.) are handled by MS Windows.

The multimedia application development system needs to be installed in MS Windows. The installation involves loading files of bitmaps, cells, sound, video, etc. from removable storage media (e.g., floppy, CD-ROM, etc.) to appropriate directories in the hard disk of the computer. Programs are linked to MS Windows and icons are placed at appropriate positions. Thus, a user can invoke the development system by clicking on an icon under MS Windows. Once the development system is running, various cells can be invoked by clicking on icons associated with the cells.

Figure 12:
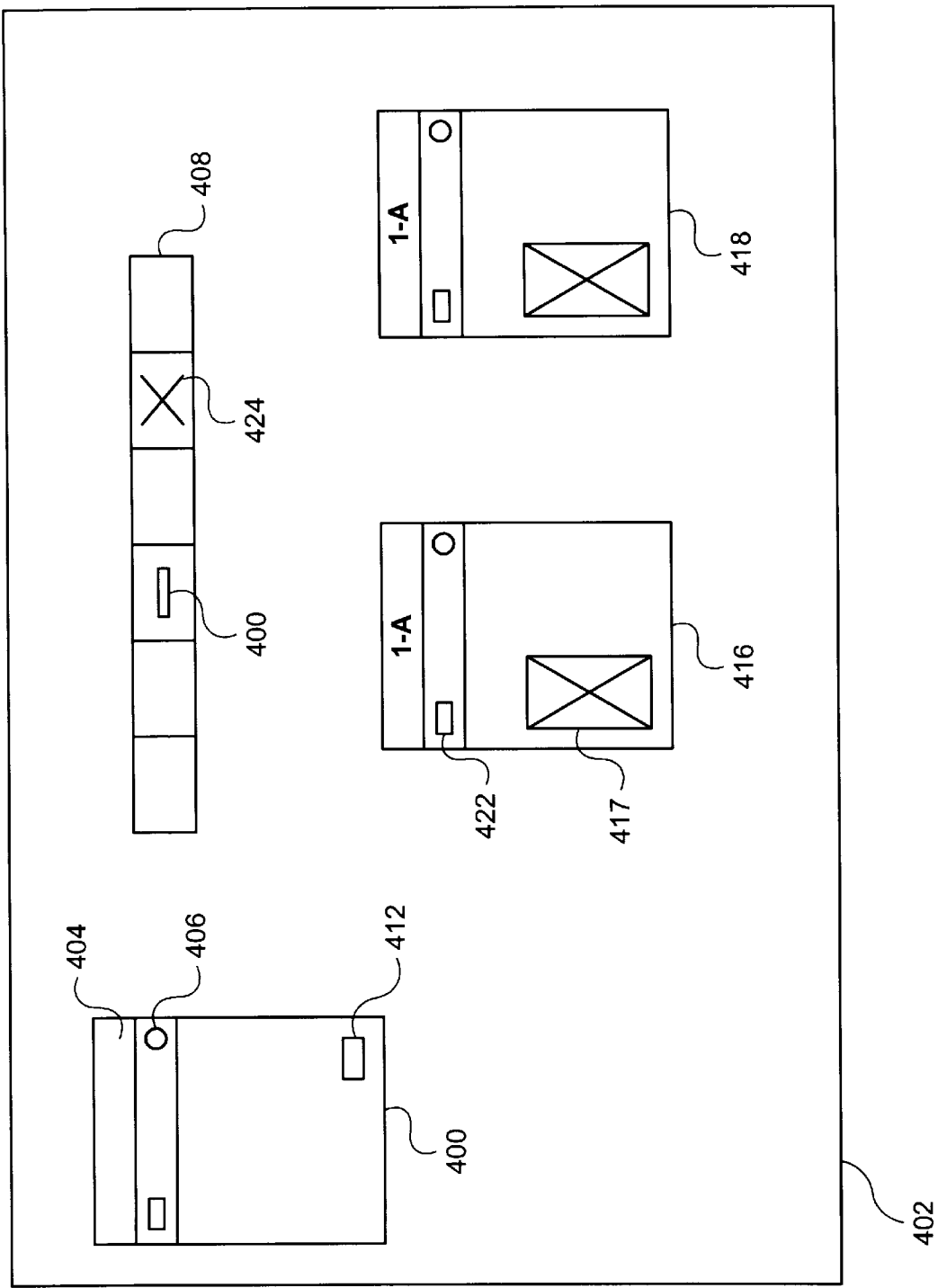
FIG. 12 shows various windows associated with visual cells during the execution of a multimedia development system in accordance with the present invention.

FIG. 12 shows a window 400 representing a first visual cell displayed on a display screen 402 under the control of MS Windows 386. Window 400 typically contains a graphic image (not shown) and a title bar 404. A user can click on an icon 406 in windows 400, and a side bar 408 is displayed. Side bar 408 contains spaces for displaying icons allowing the user to add functionalities to the first visual cell associated with window 400.

One of the spaces of side bar 408 contains an icon 410 for allowing a user to attach an icon for invoking a second visual cell to window 400. After the user clicks on icon 410, a symbol helps the user to place an icon 412 inside window 400 for representing the second visual cell. A window 430, shown in FIG. 13, then appears which allows the user to define the characteristics of the second visual cell. Side bar 408 also contains an icon 424 which allows the user to delete a visual cell placed inside window 400.

Figure 13:
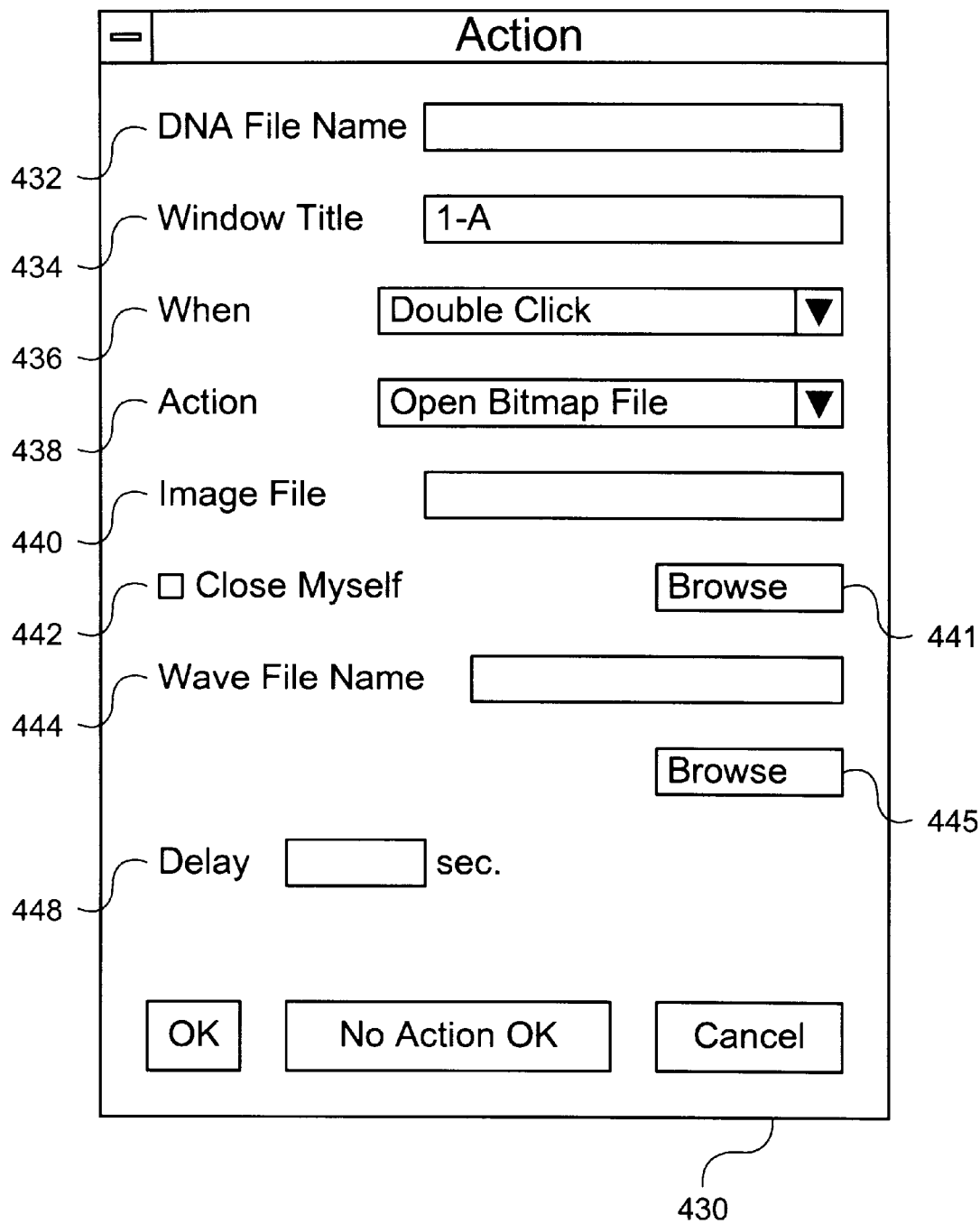
FIG. 13 shows a window for a user to enter information to a DNA file of the present invention.

Window 430 contains a line 432 for the user to enter the name of a DNA file associated with the second visual cell. The information entered in window 430 will be stored in this DNA file. Window 430 also contains a line for the user to enter the title of a graphic window showing the second visual cell. In FIG. 13, the title "1-A" is entered in line 434. A line 436 allows the user to select the mode of invoking the second visual cell. In window 430, "double click" is selected, indicating the second visual cell is invoked upon double clicking on icon 412.

Window 430 contains a line 438 allowing the user to define the action of the second visual cell. In FIG. 13, the action selected is "open bitmap file." Thus, the action performed by the second visual cell is to open a bitmap file. A line 440 allows the user to enter an image file to be opened when the second visual cell performs its action. Window 430 contains a "browse" button 441 so as to allow the user to search for image files already stored in the computer for the purpose of entering an appropriate file in line 440. Window 430 also contains a "close myself" box 442. When selected, the first visual cell will be closed automatically when the second visual cell is invoked. This is implemented by attaching a "close" parameter to a line in the linking parameter of the DNA file associated with the first visual cell which links the first and the second visual cells.

In this embodiment, lines 440–442 are associated with the action line 438. If the action selected is "close visual cell" instead of "open bitmap file," lines 440 would be changed to allow the user to enter the DNA file of a visual cell selected to be closed after invocation of the second visual cell. In this embodiment, the second visual cell sends a "quit" DSF statement to the designated visual cell after invocation for the purpose of closing that cell.

It is possible to use window 430 to input a variety of actions to be performed by the second visual cell. The two examples above are for illustrative purposes only.

Window 430 contains a line 444 which allows the user to enter an audio file associated with the invocation of the second visual cell. Window 430 contains a "browse" button 445 so that the user can search for audio (typically having an extension of "WAV") files already stored in the computer for the purpose of entering an appropriate file in line 444.

Window 430 contains a line 448 allowing the user to enter a delay. This parameter allows the second visual cell to manifest itself a predetermined time interval after icon 412 is clicked on.

It should be appreciated that the format of and information requested by window 430 is exemplary. Depending on the design objective and creativity of a programmer, window 430 could have other formats and request different types of information. When window 430 is closed (after all essential information has been entered by the user), the information contained therein is stored in the DNA file indicated on line 432. In this embodiment, the DNA file is an ASCII text file stored in the hard disk.

When a user clicks on icon 412, a window 416 is opened to represent one instance of the second visual cell. Window 416 has characteristics defined by its associated DNA file. For example, window 416 contains the title "1-A" (as determined from line 434 of window 430) and a graphic image 417 associated with the image file defined in line 440. The position of window 416 can be moved around using normal MS Windows methods (i.e., drag and drop). When a user clicks on icon 412 again, another window 418 of the second visual cell appears simultaneously with window 416. In this case, two copies of the second visual cell are loaded into the RAM, each is associated with the same DNA file.

It is possible to terminate the first visual cell while the second visual cell is active. In FIG. 12, each visual cell window has a "close" button, such as button 422 in window 416, for allowing the user to close the window. In the development system shown in FIG. 12, the user can close window 400 associated with the first visual cell while windows 416 and 418 continue to be active on display screen 402.

It is also possible to close window 400 using a statement issue by the second visual cell. As explained before, line 438 of FIG. 13 can be set to "close visual cell" and the name of the visual cell is set to the first visual cell. When the second visual cell is invoked, it will send a DSF statement to the DNA file associated with the first visual cell for the purpose of closing the first visual cell.

Figure 14:
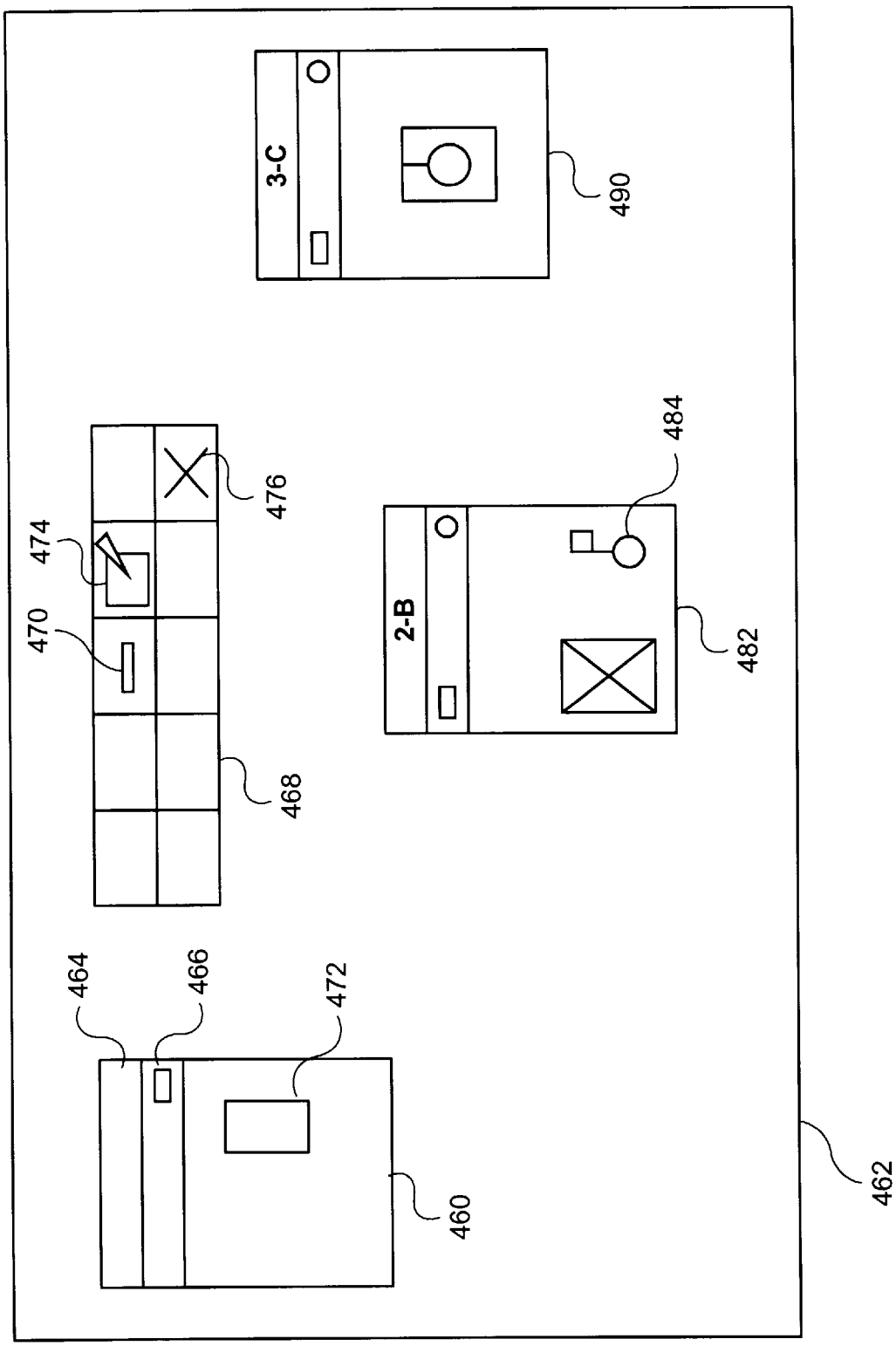
FIG. 14 shows various windows associated with a button cell and visual cells during the execution of a multimedia development system in accordance with the present invention.

An example showing two cells of different types, a visual cell and a button cell, is described below. FIG. 14 shows a window 460 representing a button cell displayed on a display screen 462 under the control of MS Windows 386 of FIG. 11. Window 460 contains a title bar 464. A user can click on an icon 466 in window 460 and a side window 468 is displayed. Side window 468 contains spaces for displaying icons allowing the user to add buttons to, and remove buttons from, window 460.

One of the spaces of side window 468 contains an icon 470 for allowing a user to attach a button to window 460. After the user clicks on icon 470 in side window 468, a symbol appears to help the user to place a button 472 at a desired position inside window 460. This new button can later be clicked on by the user and a sequence of user-defined activities will occur. Side window 468 also contains an icon 476 which allows the user to remove an existing button inside window 460.

Figure 15:
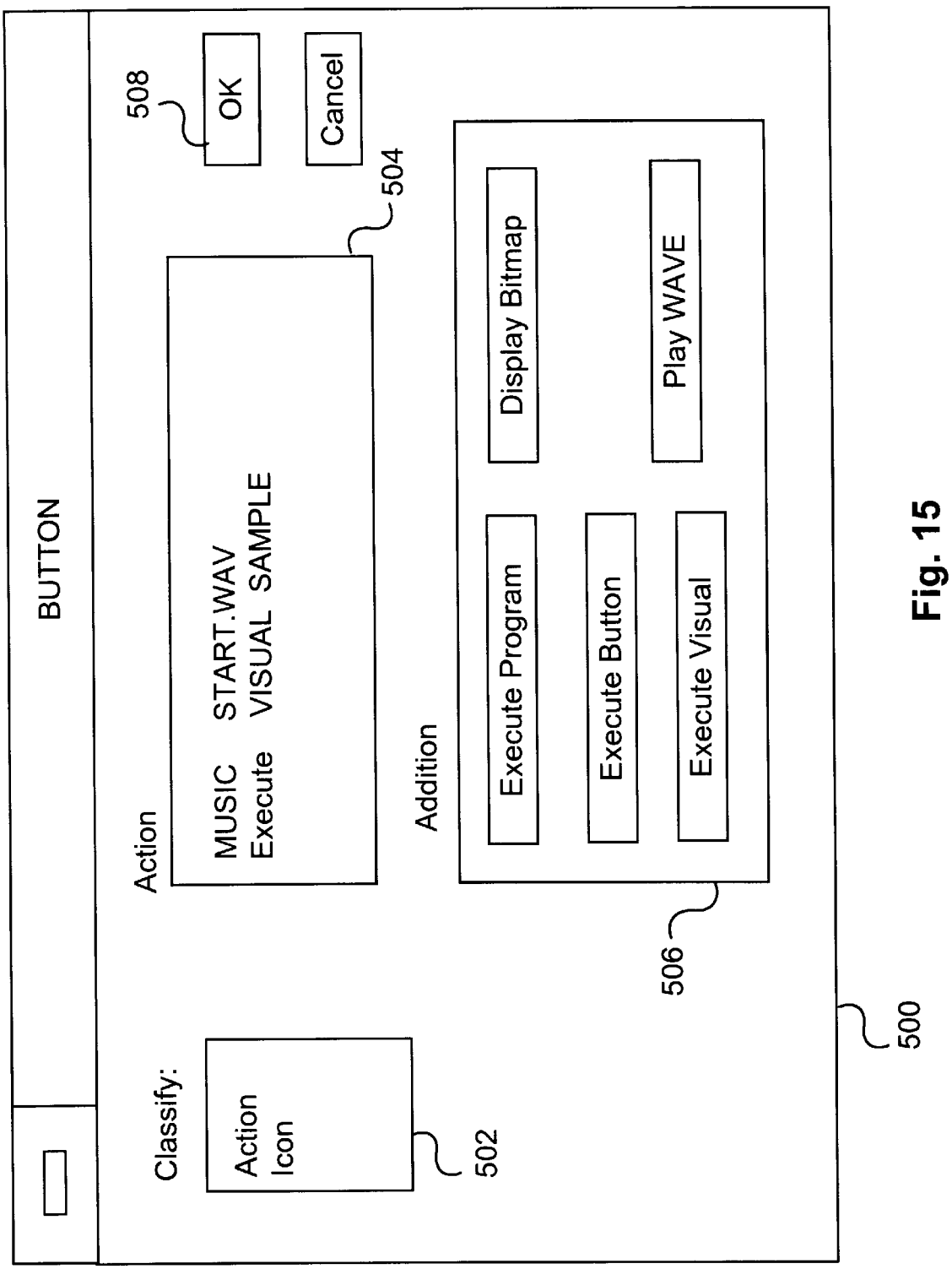
FIG. 15 is a window showing the format for a user to specify a button in accordance with the present invention.

The user can then click on another icon 474 in side window 468 which opens a windows 500, shown in FIG. 15, allowing the user to define the characteristics of button 472. Window 500 contains an area 502 showing a list of items for allowing the user to select the types of information to be entered into window 500. For example, selection of "action" allows the user to enter the actions to be taken by button 472 when it is invoked while selection of "icon" allows the user to choose an icon to represent the button cell instead of using a simple rectangular button. The list may contain other items. Depending on the choice of item in the list, the appearance of, and information requested by, window 500 will be different.

In list 502, "action" is selected. As a result of such choice, an "action" window 504 and "addition" window 506 are displayed. Action window 504 shows the actions of button 472 when invoked. The content of action window 504 is selected by user using addition window 506.

Figure 16:
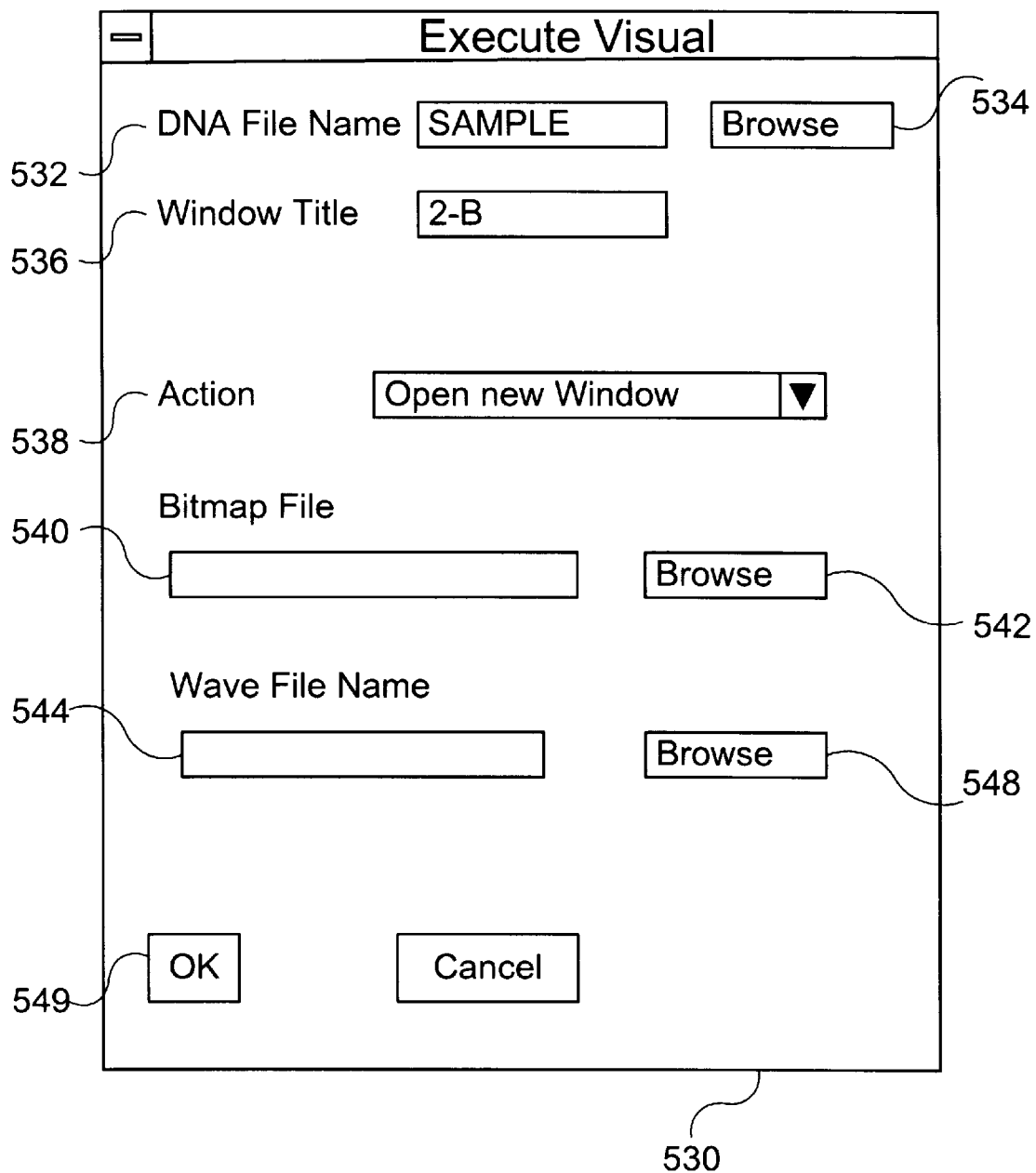
FIG. 16 is a window showing the format for a user to specify a visual cell associated with a button cell in accordance with the present invention.

Addition window 506 contains a plurality of actions, such as "execute program," "execute button," "execute visual," "play wave," and "display bitmap. " The user can click on any one of these actions and a window for allowing the user to further define the action will be displayed. An example of such a window for "execute visual" is shown in FIG. 16. The user can select one or more actions in addition window 506.

The selected action is displayed on action window 504. For example, action window 504 contains a line "MUSIC START.WAV" indicating that the "play wave" action in addition window 506 has previously been selected. A window associated with "play wave" (not shown) allows the user to indicate that an audio file named "START.WAV" should be played. Action window 504 also contains a line "EXECUTE VISUAL SAMPLE" indicating that the "execute visual" action in addition window 506 has previously been selection. When the user clicks on an "OK" button 508, the information entered in window 500 is stored in a DNA file associated with this button cell.

The specification of visual cell SAMPLE is now described. A window 530 of FIG. 16 shows the type of information requested upon selecting the "execute visual" action of addition window 506. Window 530 contains a line 532 for the user to enter the DNA file of the visual cell desired to be invoked. In this case, the name is "SAMPLE" which corresponds to the "Execute VISUAL" line in action window 504. Window 530 contains a "browse" button 534 in case the user needs to find a list of preexisting DNA filename. Window 530 also contains a line 536 for the user to enter the title of the visual cell window. In this case, the title is "2-B." Window 530 contains a line 538 for allowing the user to enter the action desired. Examples of actions are "open new window," "open new vector," "open new movie," etc. The content of the next line in window 530, line 540, depends on the selection in line 538. In this example, line 540 allows the user to enter the name of a bitmap file because the action in line 538 is "open new window." If the action in line 538 is "open new vector" or "open new movie," line 540 will request the name of a vector file or a video file, respectively. Window 530 contains a "browse" button 542 allowing the user to find a desired preexisting bitmap file. Window 530 contains a line 544 allowing the user to enter an audio file when the visual cell is invoked. Window 530 contains a "browse" button 548 allowing the user to select a desired preexisting WAV file. When the user clicks on an "OK" button 549, the information entered in window 530 will be used to specify the selected visual cell associated with button 472. This information, along with the rest of the information entered in window 500, will later be stored in the DNA file of button 472.

When all the information relating to button 472 has been entered and stored, button 472 can be invoked. Returning now to FIG. 14, side window 468 can be removed by clicking on icon 466. Removing side window 468 changes window 460 from an edit mode (for allowing users to add, modify and remove buttons) to an active mode (for allowing users to invoke buttons in window 460). In this embodiment, button 466 acts as a toggle for displaying and removing side window 468. After side window 468 is removed, the user can click on button 472 to invoke its associated actions: play a piece of music and display a window 482 corresponding to visual cell SAMPLE. The title of SAMPLE's window is "2-B", which corresponds to line 536 of FIG. 16. In this example, window 482 contains an icon 484 which allows another visual cell to be invoked. This icon 484 has been previously placed in visual cell SAMPLE in a manner similar to the operation discussed above in connection with FIG. 12. The user can click on icon 484 to display another window 490 corresponding to a different visual cell.

It should be appreciated that the format of and information requested by windows 500 and 530 is exemplary. Depending on the design objective and creativity of a programmer, windows 500 and 530 could have other formats and request different types of information.

Another example of an application running under the system of FIG. 11 is a hotel index system displayed on the screen of a computer. The application can be formed by assembling a collection of cells. Any of the cells can be invoked first. For example, a user of the application can invoke (e.g. by clicking on) a cell which is designed to show a window containing the index. Another cell becomes active when a user clicks on an item in the index window. This new cell display itself as another window that shows a regional map. The user can click on an item on the map window to activate a third cell, which includes text or pictures in its display. In this way, more than one cell is active simultaneously, creating an application program.

Figure 17:
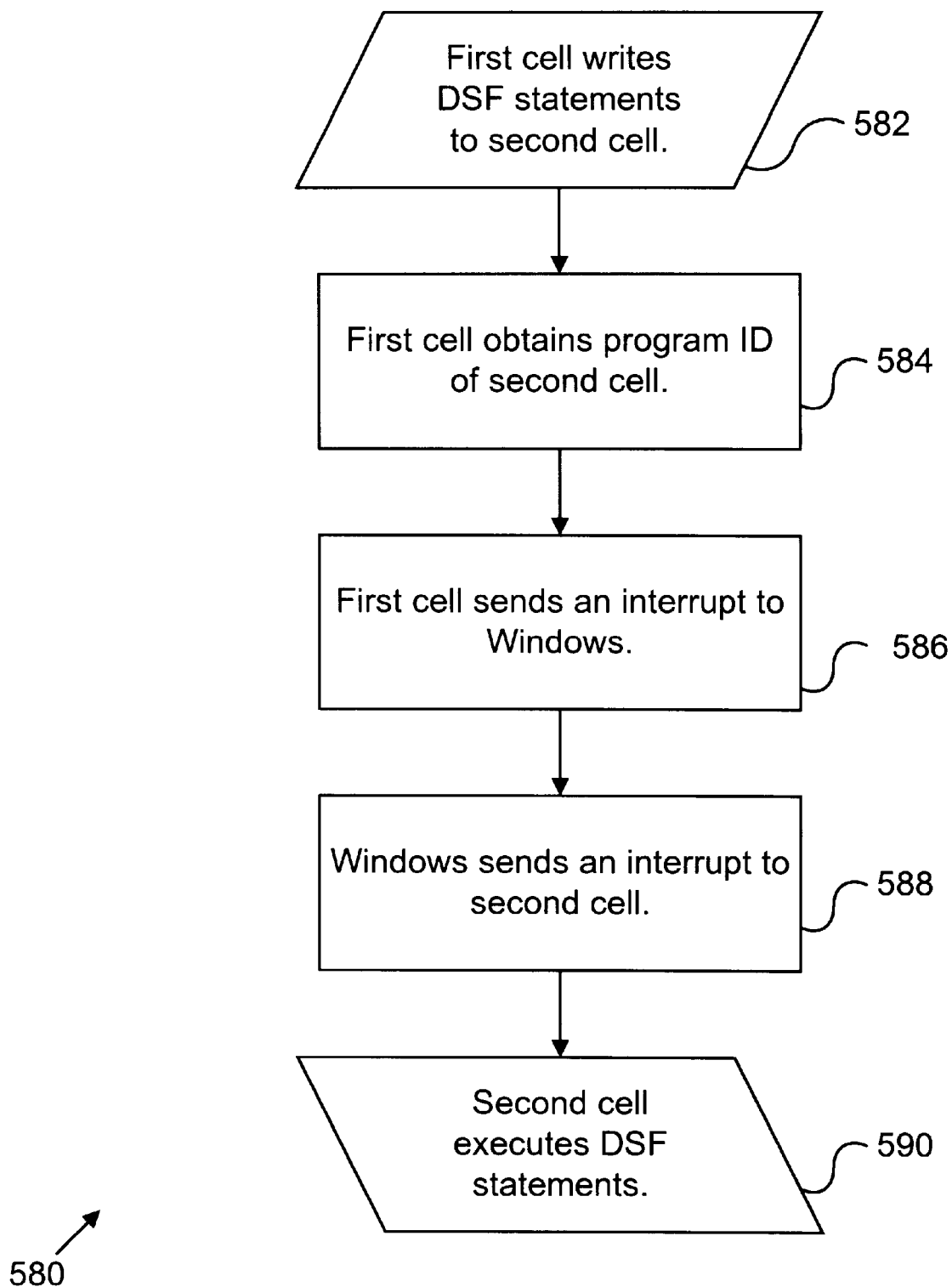
FIG. 17 is a flow chart showing a cell notification procedure in accordance with the present invention.

As mentioned above, in one embodiment of the present architecture, a cell can indirectly notify another cell after writing DSF statements thereto. FIG. 17 is a flow chart 580 showing an embodiment of indirect notification of cells. In this example, MS Windows 386 of FIG. 11 assigns a program identification to each program (including the cells) running on it. After a first cell writes a set of DSF statements to a DSF file of a second cell (step 582), it obtains the program identification of the second cell (step 584). The first cell sends an interrupt to MS Windows 386 requesting it to send an interrupt to the second cell (step 586). In response to this request, MS Windows 386 sends an interrupt to the second cell (step 588). The second cell then executes the DSF statement previously written to its associated DNA file (step 590).

It should be appreciated that the MS Windows in the above flow chart is merely an example of an operating system. Other operating systems, such as MS DOS and Macintosh OS, can be used to perform the interrupt in place of MS Windows.

What is claimed is:

1. A method for a user to design a graphic-user-interface-based application executing under a windows-based environment, said environment providing a parent-child relationship between windows in which a child window is bounded by a parent window and moves together with said parent window, comprising the steps of:

providing a plurality of program modules, each of said program modules associating with a display window and capable of communicating with other program modules;

selecting at least a first and a second one of said plurality of program modules, said first program module being associated with a first display window and said second program module being associated with a second display window, said first program module controlling operations of said second program module by sending commands to said second program module;

selecting a third program module from said plurality of program modules, said third program module being associated with a third display window;

positioning, by said user, said first and said second display windows in a position inside said third display window;

changing said first and said second display windows to be children of said third display window so that said first and said second display windows are bounded by and moves with said third display window;

said first program module being associated with a first parameter file;

said second program module being associated with a second parameter file;

said first program module containing means for sending a first command to said second parameter file;

said second program module containing means for sending a second command to said first parameter file;

said first program module containing means for executing said second command in said first parameter file without returning result of execution to said second program module; and said second program module containing means for executing said first command in said second parameter file without returning result of execution to said first program module.

2. The method of claim 1 further comprising the step of selecting a fourth program module from said plurality of program modules, said fourth program module being associated with a relationship window for showing parent-child relationship of said first, said second and said third program modules.

3. The method of claim 2 wherein said relationship window contains means for allowing said user to change relationship between different windows, and wherein said changing step is performed using said relationship window.

4. The method of claim 2 wherein said relationship window contains means for allowing said user to change relationship between different windows, and wherein said changing step is performed using said relationship window.

5. The method of claim 2 wherein said first and said second display windows each contains means for allowing said user to identify it as a child window.

6. The method of claim 5 wherein said means for allowing comprises an icon.

7. The method of claim 1 wherein said first and said second display windows each contains means for allowing said user to identify it as a child window.

8. The method of claim 7 wherein said means for allowing comprises an icon.

9. The method of claim 1 wherein said graphic-user-interface-based application is a Microsoft Windows based application.

10. A method for a user to design a graphic-user-interface-based application executing under a windows-based environment, said environment providing a parent-child relationship between windows in which a child window is bounded by a parent window and has a definite position relative to said parent window, comprising the steps of:

providing a plurality of program modules, each of said program modules can be displayed as either a display window or an edit window, each of said program modules having a parameter file and capable of communicating with other program modules;

selecting a first one of said plurality of program modules, said first program module being displayed as a first edit window and said first edit window containing a first icon;

selecting a second program module from said plurality of program modules, said second program module being displayed as a second display window;

clicking, by said user, on said icon of said first edit window for indicating a desire to change said first edit window into a child window;

positioning said first edit window inside said second display window;

changing said first edit window into a first display window; and changing said first display window to be a child of said second display window.

11. The method of claim 10 wherein said graphic-user-interface-based application is a Microsoft Windows based application.

12. The method of claim 10 wherein said first program module being associated with a first parameter file;

said second program module being associated with a second parameter file;

said first program module containing means for sending a first command to said second parameter file;

said second program module containing means for sending a second command to said first parameter file;

said first program module containing means for executing said second command without returning result of execution to said second program module; and said second program module containing means for executing said first command without returning result of execution to said first program module.

* * * * *